(12) United States Patent
Border et al.

(10) Patent No.: US 7,006,480 B2
(45) Date of Patent: Feb. 28, 2006

(54) METHOD AND SYSTEM FOR USING A BACKBONE PROTOCOL TO IMPROVE NETWORK PERFORMANCE

(75) Inventors: John Border, Poolesville, MD (US); Greg Gee, San Diego, CA (US)

(73) Assignee: Hughes Network Systems, LLC, El Segundo, CA (US)

( * ) Notice: Subject to any disclaimer, the term of this patent is extended or adjusted under 35 U.S.C. 154(b) by 907 days.

(21) Appl. No.: 09/905,502

(22) Filed: Jul. 13, 2001

(65) Prior Publication Data

US 2002/0034173 A1    Mar. 21, 2002

Related U.S. Application Data

(60) Provisional application No. 60/220,026, filed on Jul. 21, 2000, provisional application No. 60/225,630, filed on Aug. 15, 2000.

(51) Int. Cl.
*H04Q 7/24*    (2006.01)

(52) U.S. Cl. ................ 370/338; 370/389; 370/395; 370/466

(58) Field of Classification Search ................ 370/338, 370/345, 352–354, 389–396, 252; 709/219, 709/220, 227, 229, 204, 238, 217; 379/114.15, 379/90, 93, 201; 713/150, 160, 201
See application file for complete search history.

(56) References Cited

U.S. PATENT DOCUMENTS 5,841,980 A * 11/1998 Waters et al. ............... 709/204

6,012,088 A * 1/2000 Li et al. .................... 709/219

(Continued)

FOREIGN PATENT DOCUMENTS

EP    0 903 905 A2    3/1999

OTHER PUBLICATIONS

Kowtha, S.; Encapsulating ATM cells in TCP/IP for transport between ATM based backbone and end-user terminals, to enable real-time network-aware services, ATM Workshop, 1999. IEEE Proceedings, May 24-27, 1999 □□pp.: 195-203.*

(Continued)

*Primary Examiner*—Kwang Bin Yao
*Assistant Examiner*—Prenell Jones
(74) *Attorney, Agent, or Firm*—Craig Plastrik

(57) ABSTRACT

A communication system having a proxy architecture is disclosed. The system includes a platform that provides performance enhancing functions. The platform includes a backbone connection apparatus that routes information within a communication system. The backbone connection apparatus receives backbone connection parameters from the platform and maintains the current parameters in one or more backbone connection profiles. The backbone connection apparatus routes packets of information throughout the communication system based on the backbone connection profile. The backbone connection apparatus supports the use of different backbone protocol for different types of backbone links. Further, in a configuration where multiple backbone links of different types exist, the backbone connection apparatus supports the use of a different backbone protocol for each type of link at the same time. The above arrangement has particular applicability to a bandwidth constrained communication system, such as a satellite network.

44 Claims, 15 Drawing Sheets

U.S. PATENT DOCUMENTS

| | | | |
|---|---|---|---|
| 6,434,134 B1 * | 8/2002 | La Porta et al. | 370/338 |
| 6,618,393 B1 * | 9/2003 | Chiles et al. | 370/466 |
| 6,748,439 B1 * | 6/2004 | Monachello et al. | 709/229 |
| 6,820,132 B1 * | 11/2004 | Puente et al. | 709/238 |
| 6,836,483 B1 * | 12/2004 | Lee | 370/395.31 |
| 6,856,676 B1 * | 2/2005 | Pirot et al. | 379/201.01 |

OTHER PUBLICATIONS

CISCO White Paper, Policy-based routing, policy-base routing data forwarding, Jul. 3, 2000, pp. 1-7.*

Jabbari, B. et al; Communications, 1990. ICC 90, Including Supercomm Technical Session. ☐☐SUPERCOMM/ICC '90. Conference Record., IEEE International Conference on Apr. 16-19, 1990 Page(s):376-380 vol. 2.*

R. Braden, D. Clark, S. Shenker, "Integrated Services In The Internet Architecture An Overview", Network Working Group Request For Comments, No. 1633, Jun. 1994, XP002960148, pp. 1-34.

"Policy-Based Routing, Policy-Based Routing Data Forwarding" Cisco White Paper, Jul. 3, 2000, XP002241435, pp. 1-15.

J.S. Baras, S. Corson, S. Papademetriou, I. Seeka, and N. Suphasindhu, "Fast Asymmetric Internet Over Wireless Satellite-Terrestrial Networks", Milcom 97 Proceedings. Nov. 3-5, 1997, Annual Military Communications Conference, New York, NY: IEEE, US, vol. 1, Nov. 3, 1997, XP000799704, pp. 372-377.

Xiaoqiang Chen and Duke Thanes Tantiprasut, "Evolution of ATM Internetworking", Bell Labs Technical Journal, Wiley, CA, US, vol. 2, No. 2, Mar. 21, 1997, pp. 82-.

* cited by examiner

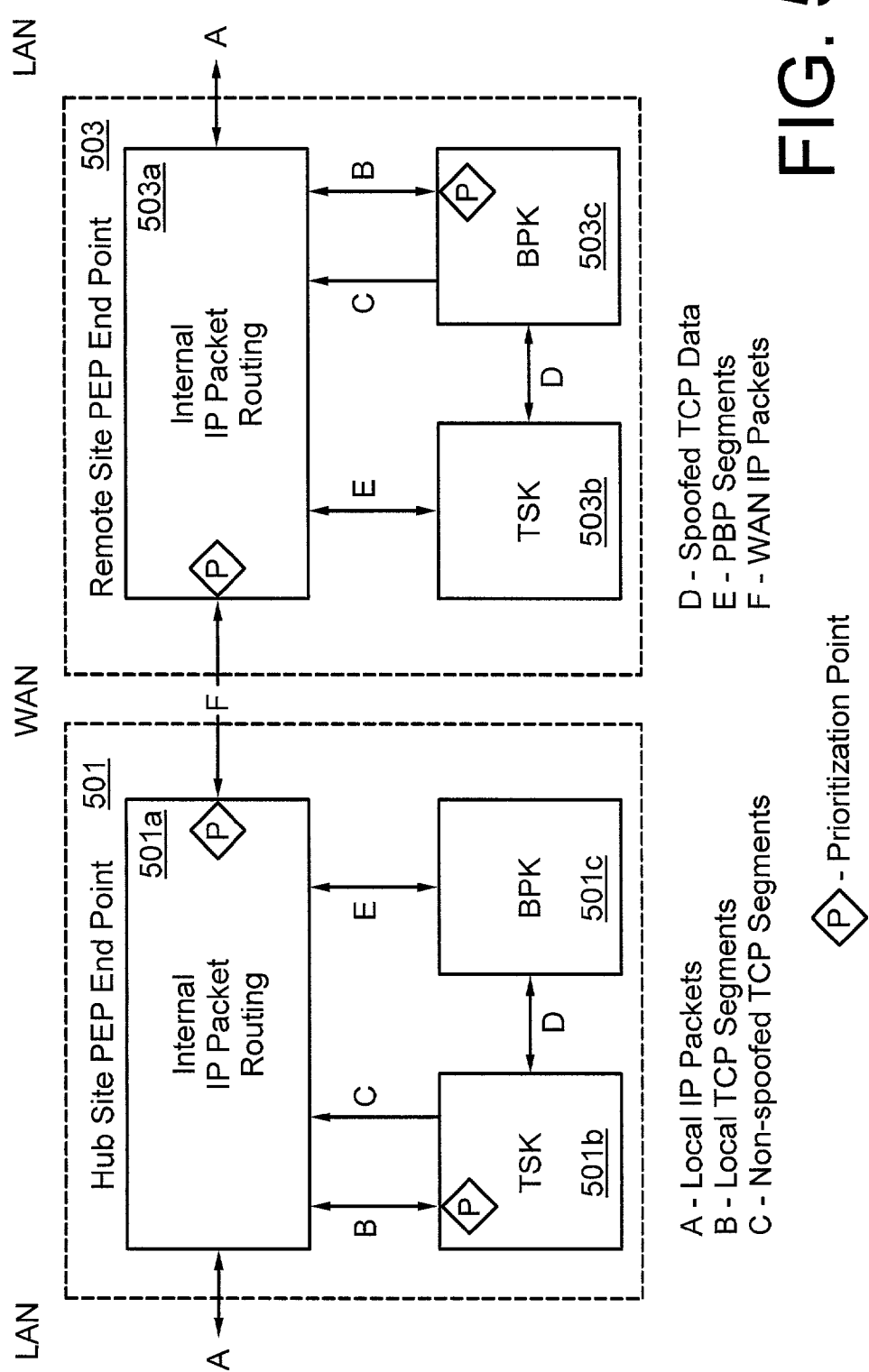

TCP CONNECTION

METHOD AND SYSTEM FOR USING A BACKBONE PROTOCOL TO IMPROVE NETWORK PERFORMANCE

CROSS-REFERENCES TO RELATED APPLICATION

This application is related to and claims the benefit of priority to: (i) U.S. Provisional Patent Application (Ser. No. 60/220,026), filed Jul. 21, 2000, entitled "Performance Enhancing Proxy," and (ii) U.S. Provisional Patent Application (Ser. No. 60/225,630), filed Aug. 15, 2000, entitled "Performance Enhancing Proxy"; all of which are incorporated herein by reference in their entirety.

FIELD OF THE INVENTION

The present invention is generally directed to a method and system for using a backbone protocol and more particularly, to the backbone protocol which improves network performance.

BACKGROUND

The entrenchment of data networking into the routines of modern society, as evidenced by the prevalence of the Internet, particularly the World Wide Web, has placed ever-growing demands on service providers to continually improve network performance. To meet this challenge, service providers have invested heavily in upgrading their networks to increase system capacity (i.e., bandwidth). In many circumstances, such upgrades may not be feasible economically or the physical constraints of the communication system does not permit simply "upgrading." Accordingly, service providers have also invested in developing techniques to optimize the performance of their networks. Because much of today's networks are either operating with or are required to interface with the Transmission Control Protocol/Internet Protocol (TCP/IP) suite, attention has been focused on optimizing TCP/IP based networking operations. As the networking standard for the global Internet, TCP/IP has earned such acceptance among the industry because of its flexibility and rich heritage in the research community.

The transmission control protocol (TCP) is the dominant protocol in use today on the Internet. TCP is carried by the Internet protocol (IP) and is used in a variety of applications including reliable file transfer and Internet web page access applications. The four layers of the TCP/IP protocol suite are illustrated in FIG. 14. As illustrated, the link layer (or the network interface layer) 1410 includes device drivers in the operating system and any corresponding network interface cards. Together, the device driver and the interface cards handle hardware details of physically interfacing with any cable or whatever type of media is being used. The network layer (also called the Internet layer) 1412 handles the movement of packets around the network. Routing of packets, for example, takes place at the network layer 1412. IP, Internet control message protocol (ICMP), and Internet group management protocol (IGMP) may provide the network layer in the TCP/IP protocol suite. The transport layer 1414 provides a flow of data between two hosts, for the application layer 1416 above.

In the TCP/IP protocol suite, there are at least two different transport protocols, TCP and a user datagram protocol (UDP). TCP, which provides a reliable flow of data between two hosts, is primarily concerned with dividing the data passed to it from the application layer 1416 into appropriately sized chunks for the network layer 1412 below, acknowledging received packets, setting timeouts to make certain the other end acknowledges packets that are sent, and so on. Because this reliable flow of data is provided by the transport layer 1414, the application layer 1416 can ignore these details. UDP, on the other hand, provides a much simpler service to the application layer 1416. UDP just sends packets of data called datagrams from one host to another, but there is no guarantee that the datagrams reach the other end. Any desired reliability must be added by the application layer 1416.

The application layer 1416 handles the details of the particular application. There are many common TCP/IP applications that almost every implementation provides. These include telnet for remote log-in, the file transfer protocol (FTP), the simple mail transfer protocol (SMTP) or electronic mail, the simple network management protocol (SNMP), the hypertext transfer protocol (HTTP), and many others.

As described above, TCP provides reliable, in-sequence delivery of data between two IP hosts. The IP hosts set up a TCP connection, using a conventional TCP three-way handshake and then transfer data using a window based protocol with the successfully received data acknowledged.

To understand where optimizations may be made, it is instructive to consider a typical TCP connection establishment.

FIG. 15 illustrates an example of the conventional TCP three-way handshake between IP hosts 1520 and 1522. First, the IP host 1520 that wishes to initiate a transfer with IP host 1522, sends a synchronize (SYN) signal to IP host 1522. The IP host 1522 acknowledges the SYN signal from IP host 1520 by sending a SYN acknowledgement (ACK). The third step of the conventional TCP three-way handshake is the issuance of an ACK signal from the IP host 1520 to the IP host 1522. IP host 1522 is now ready to receive the data from IP host 1520 (and vice versa). After all the data has been delivered, another handshake (similar to the handshake described to initiate the connection) is used to close the TCP connection.

TCP was designed to be very flexible and works over a wide variety of communication links, including both slow and fast links, high latency links, and links with low and high error rates. However, while TCP (and other high layer protocols) works with many different kinds of links, TCP performance, in particular, the throughput possible across the TCP connection, is affected by the characteristics of the link in which it is used. There are many link layer design considerations that should be taken into account when designing a link layer service that is intended to support Internet protocols. However, not all characteristics can be compensated for by choices in the link layer design. TCP has been designed to be very flexible with respect to the links which it traverses. Such flexibility is achieved at the cost of sub-optimal operation in a number of environments vis-á-vis a tailored protocol. The tailored protocol, which is usually proprietary in nature, may be more optimal, but greatly lacks flexibility in terms of networking environments and interoperability.

An alternative to a tailored protocol is the use of performance enhancing proxies (PEPs), to perform a general class of functions termed "TCP spoofing," in order to improve TCP performance over impaired (i.e., high latency or high error rate) links. TCP spoofing involves an intermediate network device (the performance enhancing proxy (PEP)) intercepting and altering, through the addition and/or deletion of TCP segments, the behavior of the TCP connection in an attempt to improve its performance.

Conventional TCP spoofing implementations include the local acknowledgement of TCP data segments in order to get the TCP data sender to send additional data sooner than it would have sent if spoofing were not being performed, thus improving the throughput of the TCP connection. Generally, conventional TCP spoofing implementations have focused simply on increasing the throughput of TCP connections either by using larger windows over the link or by using compression to reduce the amount of data which needs to be sent, or both.

Many TCP PEP implementations are based on TCP ACK manipulation. These may include TCP ACK spacing where ACKs which are bunched together are spaced apart, local TCP ACKs, local TCP retransmissions, and TCP ACK filtering and reconstruction. Other PEP mechanisms include tunneling, compression, priority-based multiplexing, policy based routing, and the ability to support failover traffic.

A backbone link and associated backbone protocol are key elements of a network implementing PEP mechanisms. A useful backbone protocol should:

provide reliable delivery of data;

use a relatively small amount of acknowledgement traffic; and be as simple as possible while still being able to support all of the features of the network it supports;

Another desirable feature for a backbone protocol is the capability to support generic backbone use.

Some existing protocols that can be used as backbone protocols include:

TCP and variants;

The Xpress Transport Protocol (XTP);

The Message Multiplexing protocol (MEMUX);

The Satellite Transport Protocol (STP);

The Service Specific Connection Oriented Protocol (SS-COP);

The Internet Reliable Transport Protocol (IRTP);

The Optimum Data Link Control (ODLC) protocol;

The Reliable Data Protocol (RDP); and

The Boosted Session Transport (BST) Protocol.

However, none of the protocols listed above are completely suitable for all types of backbone links. For example, TCP performance is limited across links with high bandwidth-delay products. (This is why a PEP is used to do TCP spoofing in the first place.) Also, in some cases, the protocol specification does not completely specify protocol behavior for all of the characteristics of a backbone link. For example, the RDP specification describes the use of NULL segments to detect link failures but does not provide a description of how to use them for this purpose.

SUMMARY OF THE INVENTION

Because of the issues related to the selection of a backbone protocol, the present invention supports the use of different backbone protocols for different types of backbone links. And, in a configuration where multiple backbone links of different types may exist, the invention supports the use of a different backbone protocol for each type of link at the same time.

The method and system of the present invention utilize a backbone protocol which detects link failures, supports dynamic adjustment of window size, defines the limit on the number of retransmissions before giving up and declaring a link down, and scales well for use with large windows. The backbone protocol of the present invention also does not require a slow start algorithm, as a result, bandwidth limitations can be handled via flow control exerted (via buffer space availability) at the transmission points and via buffer space feedback between backbone protocol peers.

Further, the present invention addresses the above-stated need providing a communication system with performance enhancing functionality. A backbone connection apparatus communicates with the performance enhancing proxy (PEP) end point platforms to configure the platforms by utilizing profiles corresponding to the PEP end point platforms. According to one aspect of the present invention, a method for routing information in a communication system that includes a platform and a backbone connection apparatus configured to perform a plurality of performance enhancing functions is provided. The method includes receiving the information from the platform and receiving backbone connection parameters, wherein the backbone connection apparatus maintains a profile that contains the backbone connection parameters and routing the information in accordance with the profile.

According to another aspect of the invention, a communication system including a platform that is configured to provide performance enhancing functions is provided. The platform supplies information and backbone connection parameters to a backbone connection apparatus. The backbone connection apparatus includes a profile that specifies the backbone connection parameters, wherein the communication system is configured to route the information in accordance with a profile.

According to another aspect of the present invention, a backbone connection apparatus for routing information in a communication system that includes a platform configured to perform a plurality of performance enhancing functions is provided. The backbone connection apparatus includes means for receiving information and backbone connection parameters, means for maintaining a profile containing the backbone connection parameters and means for routing the information in accordance with the profile.

According to another aspect of the present invention, a computer-readable medium carrying one or more sequences of one or more instructions for routing information in a communication system that includes a platform configured to perform a plurality of performance enhancing functions is provided. The computer-readable medium carries one or more sequences of one or more instructions, which, when executed by one or more processors, cause the one or more processors to perform the steps of receiving the information from the platform and receiving backbone connection parameters, wherein the backbone connection apparatus maintains a profile that contains the backbone connection parameters and routing the information in accordance with the profile.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a diagram of a PEP packet flow between two PEP end points, according to an embodiment of the present invention;

DETAILED DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Although the present invention is discussed with respect to the Internet and the TCP/IP protocol suite, the present invention has applicability to other packet switched networks and equivalent protocols.

Figure 1:
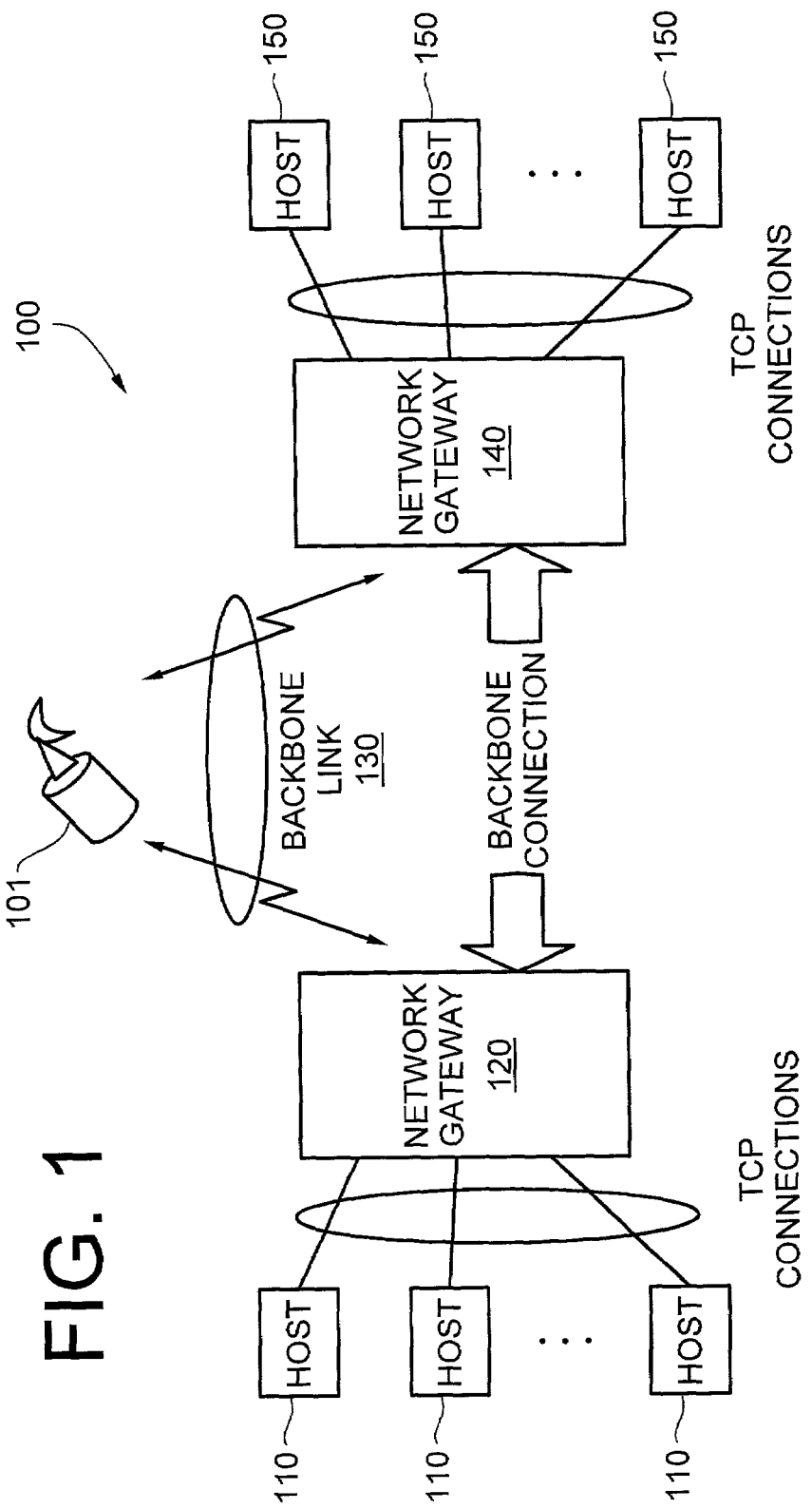
FIG. 1 is a diagram of a communication system in which the performance enhancing proxy (PEP) of the present invention is implemented.

FIG. 1 illustrates an exemplary network 100 in which the performance enhancing proxy (PEP) of the present invention may be utilized. The network 100 in FIG. 1 includes one or more hosts 110 connected to a network gateway 120 via TCP connections. The network gateway 120 is connected to another network gateway 140 via a backbone connection on a backbone link 130. As seen in FIG. 1, the backbone link 130, in an exemplary embodiment, is shown as a satellite link that is established over a satellite 101; however, it is recognized by one of ordinary skill in the art that other network connections may be implemented. For example, these network connections may be established over a wireless communications system, in general, (e.g., radio networks, cellular networks, etc.) or a terrestrial communications system. The network gateway 140 is further connected to a second group of hosts 150, also via TCP connections. In the arrangement illustrated in FIG. 1, the network gateways 120, 140 facilitate communication between the groups of hosts 110, 150.

The network gateways 120, 140 facilitate communication between the two groups of hosts 110, 150 by performing a number of performance enhancing functions. These network gateways 120, 140 may perform selective TCP spoofing, which allows flexible configuration of the particular TCP connections that are to be spoofed. Additionally, gateways 120, 140 employ a TCP three-way handshake, in which the TCP connections are terminated at each end of the backbone link 130. Local data acknowledgements are utilized by the network gateways 120, 140, thereby permitting the TCP windows to increase at local speeds.

The network gateways 120, 140 further multiplex multiple TCP connections across a single backbone connection; this capability reduces the amount of acknowledgement traffic associated with the data from multiple TCP connections, as a single backbone connection acknowledgement may be employed. The multiplexing function also provides support for high throughput TCP connections, wherein the backbone connection protocol is optimized for the particular backbone link that is used. The network gateways 120, 140 also support data compression over the backbone link 130 to reduce the amount of traffic to be sent, further leveraging the capabilities of the backbone connection. Further, the network gateways 120, 140 utilize data encryption in the data transmission across the backbone link 130 to protect data privacy, and provide prioritized access to backbone link 130 capacity on a per TCP connection basis. Each of the network gateways 120, 140 may select a particular path for the data associated with a connection to flow. The above capabilities of the network gateways 120, 140 are more fully described below.

Figure 2:
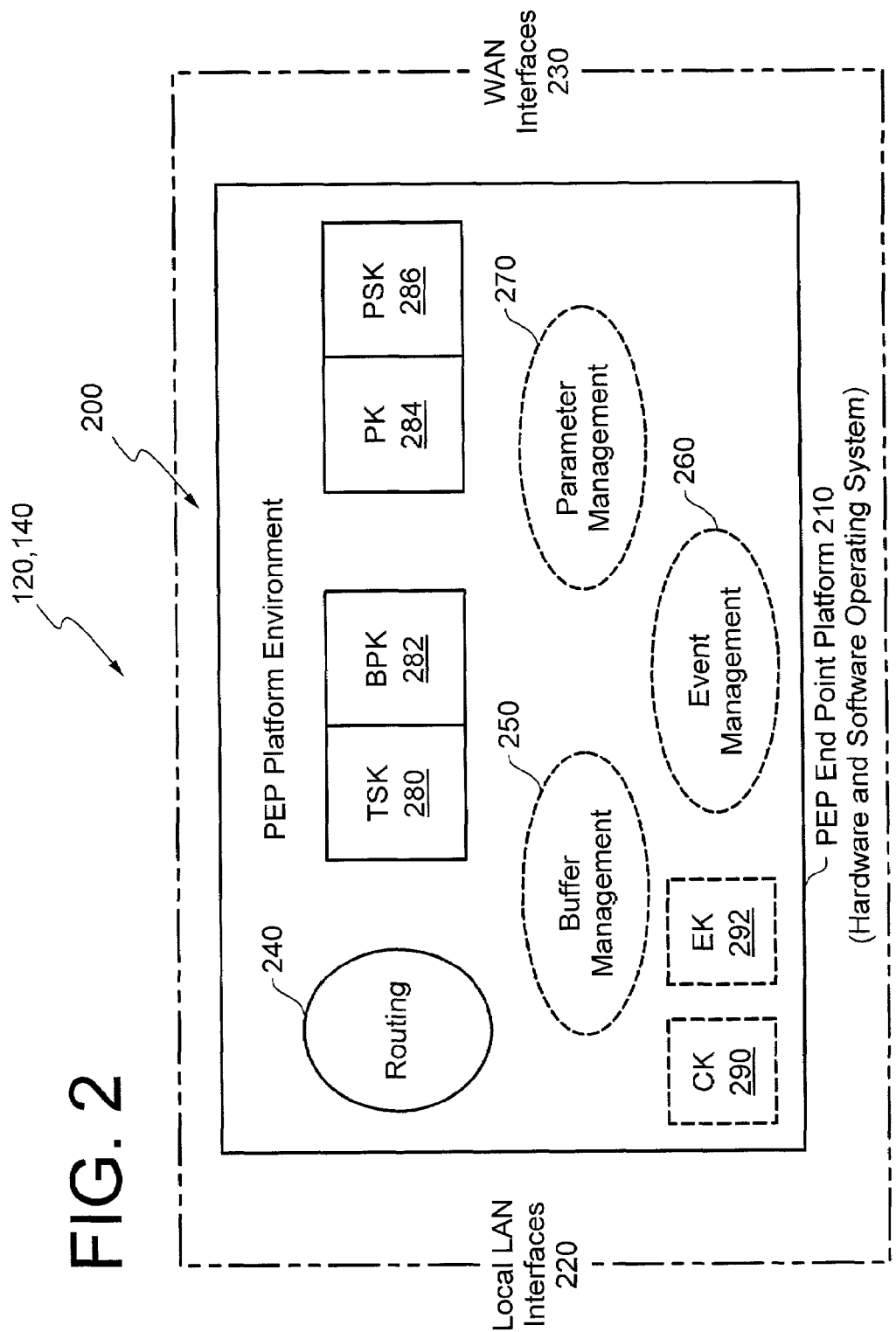
FIG. 2 is a diagram of a PEP end point platform environment, according to an embodiment of the present invention.

FIG. 2 illustrates a performance enhancing proxy (PEP) 200 as implemented in a network gateway 120, 140, according to one embodiment of the present invention. In this embodiment, the PEP 200 has a platform environment 210, which includes the hardware and software operating system. The PEP 200 also includes local area network (LAN) interfaces 220 and wide area network (WAN) interfaces 230. In the example in FIG. 1, the network gateway 120 may establish the TCP connections with the IP hosts 110, via a local LAN interface 220 and may establish the backbone connection with the network gateway 140 via a WAN interface 230. The PEP platform environment 210 may also include general functional modules: routing module 240, buffer management module 250, event management module 260, and parameter management module 270. As illustrated in FIG. 2, the network gateway also includes a TCP spoofing kernel (TSK) 280, a backbone protocol kernel (BPK) 282, a prioritization kernel (PK) 284, and a path selection kernel (PSK) 286. These four kernels essentially make up the functionality of the performance enhancing proxy 200.

The platform environment 210 performs a number of functions. One such function is to shield the various PEP kernels 280, 282, 284, 286 from implementation specific constraints. That is, the platform environment 210 performs functions that the various PEP kernels 280, 282, 284, 286 cannot perform directly because the implementation of the function is platform specific. This arrangement has the advantageous effect of hiding platform specific details from the PEP kernels 280, 282, 284, 286, making the PEP kernels more portable. An example of a platform specific function is the allocation of a buffer. In some platforms, buffers are created as they are needed, while in other platforms, buffers are created at start-up and organized into linked lists for later use. It is noted that platform specific functions are not limited to functions generic to all of the kernels 280, 282, 284, 286. A function specific to a particular kernel, for example, the allocation of a control block for TCP spoofing, may also be implemented in the platform environment to hide platform specific details from the kernel.

In one exemplary embodiment, the platform environment 210 provides the task context in which the PEP kernels 280, 282, 284, 286 run. In another exemplary embodiment, all PEP kernels 280, 282, 284, 286 can run in the same task context for efficiency; however, this is not required.

Furthermore, the platform environment 210, in an exemplary embodiment, provides an interface between the PEP functionality (embodied in kernels 280, 282, 284, 286) and the other functionality of the network gateway 120, 140. The platform environment 210 may provide the interface between the PEP functionality and the routing function 240, as seen in FIG. 2. It is noted that the platform specific functions illustrated in FIG. 2 are examples and are not considered an exhaustive list. It is further noted that the PEP kernels shown touching each other (280, 282 and 284, 286) in FIG. 2 may have a direct procedural interface to each other. Further, the kernels 280, 282, 284, 286 may include direct interfaces to improve performance, as opposed to routing everything through the platform environment 210 (as shown in FIG. 2).

In addition to the PEP kernels 280, 282, 284, and 286, the PEP end point platform 210 may utilize a data compression kernel (CK) 290 and an encryption kernel (EK) 292. These kernels 280, 282, 284, 286, 290, and 292, as described above, facilitate communication between the two groups of hosts 110, 150, by performing a variety of performance enhancing functions, either singly or in combination. These performance enhancing functions include selective TCP spoofing, three-way handshake spoofing, local data acknowledgement, TCP connection to backbone connection multiplexing, data compression/encryption, prioritization, and path selection.

Selective TCP Spoofing is performed by the TSK 280 and includes a set of user configurable rules that are used to determine which TCP connections should be spoofed. Selective TCP spoofing improves performance by not tying up TCP spoofing-related resources, such as buffer space, control blocks, etc., for TCP connections for which the user has determined that spoofing is not beneficial or required and by supporting the use of tailored parameters for TCP connections that are spoofed.

In particular, the TSK 280 discriminates among the various TCP connections based on the applications using them. That is, TSK 280 discriminates among these TCP connections to determine which connection should be spoofed as well as the manner in which the connection is spoofed; e.g., whether to spoof the three-way handshake, the particular timeout parameters for the spoofed connections, etc. TCP spoofing is then performed only for those TCP connections that are associated with applications for which high throughput or reduced connection startup latency (or both) is required. As a result, the TSK 280 conserves TCP spoofing resources for only those TCP connections for which high throughput or reduced connection startup latency (or both) is required. Further, the TSK 280 increases the total number of TCP connections which can be active before running out of TCP spoofing resources, since any active TCP connections which do not require high throughput are not allocated resources.

One criterion for identifying TCP connections of applications for which TCP spoofing should and should not be performed is the TCP port number field contained in the TCP packets being sent. In general, unique port numbers are assigned to each type of application. Which TCP port numbers should and should not be spoofed can be stored in the TSK 280. The TSK 280 is also re-configurable to allow a user or operator to reconfigure the TCP port numbers which should and should not be spoofed. The TSK 280 also permits a user or operator to control which TCP connections are to be spoofed based on other criteria. In general, a decision on whether to spoof a TCP connection may be based on any field within a TCP packet. The TSK 280 permits a user to specify which fields to examine and which values in these fields identify TCP connections that should or should not be spoofed. Another example of a potential use for this capability is for the user or operator to select the IP address of the TCP packet in order to control for which users TCP spoofing is performed. The TSK 280 also permits a user to look at multiple fields at the same time. As a result, the TSK 280 permits a user or operator to use multiple criteria for selecting TCP connections to spoof. For example, by selecting both the IP address and the TCP port number fields, the system operator can enable TCP spoofing for only specific applications from specific users.

The user configurable rules may include five exemplary criteria which can be specified by the user or operator in producing a selective TCP spoofing rule: Destination IP address; Source IP address; TCP port numbers (which may apply to both the TCP destination and source port numbers); TCP options; and IP differentiated services (DS) field. However, as indicated above, other fields within the TCP packet may be used.

As discussed above, in addition to supporting selective TCP spoofing rules for each of these criterion, AND and OR combination operators can be used to link criteria together. For example, using the AND combination operator, a rule can be defined to disable TCP spoofing for FTP data received from a specific host. Also, the order in which the rules are specified may be significant. It is possible for a connection to match the criteria of multiple rules. Therefore, the TSK 280 can apply rules in the order specified by the operator, taking the action of the first rule that matches. A default rule may also be set which defines the action to be taken for TCP connections which do not match any of the defined rules. The set of rules selected by the operator may be defined in a selective TCP spoofing selection profile.

As an example, assuming sufficient buffer space has been allocated to spoof five TCP connections, if four low speed applications (i.e., applications which, by their nature, do not require high speed) bring up connections along with one high speed application, the high speed connection has access to only ⅕ of the available spoofing buffer space. Further, if five low speed connections are brought up before the high speed connection, the high speed connection cannot be spoofed at all. Using the TSK 280 selective spoofing mechanism, the low speed connections are not allocated any spoofing buffer space. Therefore, the high speed connection always has access to all of the buffer space, improving its performance with respect to an implementation without the selective TCP spoofing feature of the TSK 280.

The TSK 280 also facilitates spoofing of the conventional three-way handshake. Three-Way Handshake Spoofing involves locally responding to a connection request to bring up a TCP connection in parallel with forwarding the connection requests across the backbone link 130 (FIG. 1). This allows the originating IP host (for example, 110) to reach the point of being able to send the data it must send at local speeds, i.e. speeds that are independent of the latency of the backbone link 130. Three-way Handshake Spoofing allows the data that the IP host 110 needs to send to be sent to the destination IP host 150 without waiting for the end-to-end establishment of the TCP connection. For backbone links 130 with high latency, this significantly reduces the time it takes to bring up the TCP connection and, more importantly, the overall time it takes to get a response (from an IP host 150) to the data the IP host 110 sends.

A specific example in which this technique is useful relates to an Internet web page access application. With three-way handshake spoofing, an IP host's request to retrieve a web page can be on its way to a web server without waiting for the end-to-end establishment of the TCP connection, thereby reducing the time it takes to download the web page.

With Local Data Acknowledgement, the TSK 280 in the network gateway 120 (for example) locally acknowledges data segments received from the IP host 110. This allows the sending IP host 110 to send additional data immediately. More importantly, TCP uses received acknowledgements as signals for increasing the current TCP window size. As a result, local sending of the acknowledgements allows the sending IP host 110 to increase its TCP window at a much faster rate than supported by end to end TCP acknowledgements. The TSK 280 (the spoofer) takes on the responsibility for reliable delivery of the data which it has acknowledged.

In the BPK 282, multiple TCP connections are multiplexed onto and carried by a single backbone connection. This improves system performance by allowing the data for multiple TCP connections to be acknowledged by a single backbone connection acknowledgement (ACK), significantly reducing the amount of acknowledgement traffic required to maintain high throughput across the backbone link 130. In addition, the BPK 282 selects a backbone connection protocol that is optimized to provide high throughput for the particular link. Different backbone connection protocols can be used by the BPK 282 with different backbone links without changing the fundamental TCP spoofing implementation. The backbone connection protocol selected by the BPK 282 provides appropriate support for reliable, high speed delivery of data over the backbone link 130, hiding the details of the impairments (for example high latency) of the link from the TCP spoofing implementation.

The multiplexing by the BPK 282 allows for the use of a backbone link protocol which is individually tailored for use with the particular link and provides a technique to leverage the performance of the backbone link protocol with much less dependency upon the individual performance of the TCP connections being spoofed than conventional methods. Further, the ability to tailor the backbone protocol for different backbone links makes the present invention applicable to many different systems.

The PEP 200 may optionally include a data compression kernel 290 for compressing TCP data and an encryption kernel 292 for encrypting TCP data. Data compression increases the amount of data that can be carried across the backbone connection. Different compression algorithms can be supported by the data compression kernel 290 and more than one type of compression can be supported at the same time. The data compression kernel 290 may optionally apply compression on a per TCP connection basis, before the TCP data of multiple TCP connections is multiplexed onto the backbone connection or on a per backbone connection basis, after the TCP data of multiple TCP connections has been multiplexed onto the backbone connection. Which option is used is dynamically determined based on user configured rules and the specific compression algorithms being utilized. Exemplary data compression algorithms are disclosed in U.S. Pat. Nos. 5,973,630, 5,955,976, the entire contents of which are hereby incorporated by reference. The encryption kernel 292 encrypts the TCP data for secure transmission across the backbone link 130. Encryption may be performed by any conventional technique. It is also understood that the corresponding spoofer (in the example outlined above, the network gateway 140) includes appropriate kernels for decompression and decryption, both of which may be performed by any conventional technique.

The PK 284 provides prioritized access to the backbone link capacity. For example, the backbone connection can actually be divided into N (N>1) different sub-connections, each having a different priority level. In one exemplary embodiment, four priority levels can be supported. The PK 284 uses user-defined rules to assign different priorities, and therefore different sub-connections of the backbone connection, to different TCP connections. It should be noted that PK 284 may also prioritize non-TCP traffic (e.g., UDP (User Datagram Protocol) traffic) before sending the traffic across the backbone link 130.

The PK 284 also uses user-defined rules to control how much of the backbone link 130 capacity is available to each priority level. Exemplary criteria which can be used to determine priority include the following: Destination IP address; Source IP address; IP next protocol; TCP port numbers (which may apply to both the TCP destination and source port numbers); UDP port numbers (which may apply to both the UDP destination and source port numbers); and IP differentiated services (DS) field. The type of data in the TCP data packets may also be used as a criterion. For example, video data could be given highest priority. Mission critical data could also be given high priority. As with selective TCP spoofing, any field in the IP packet can be used by PK 284 to determine priority. However, it should be noted that under some scenarios the consequence of using such a field may cause different IP packets of the same flow (e.g., TCP connection) to be assigned different priorities; these scenarios should be avoided.

As mentioned above, in addition to supporting selective prioritization rules for each of these criteria, AND and OR combination operators can be used to link criteria together. For example, using the AND combination operator, a rule can be defined to assign a priority for SNMP data received from a specific host. Also, the order in which the rules are specified may be significant. It is possible for a connection to match the criteria of multiple rules. Therefore, the PK 284 can apply rules in the order specified by the operator, taking the action of the first rule that matches. A default rule may also be set which defines the action to be taken for IP packets which do not match any of the defined rules. The set of rules selected by the operator may be defined in a prioritization profile.

As regards the path selection functionality, the PSK 286 is responsible for determining which path an IP packet should take to reach its destination. The path selected by the PSK 286 can be determined by applying path selection rules. The PSK 286 also determines which IP packets should be forwarded using an alternate path and which IP packets should be dropped when one or more primary paths fail. Path selection parameters can also be configured using profiles. The path selection rules may be designed to provide flexibility with respect to assigning paths while making sure that all of the packets related to the same traffic flow (e.g., the same TCP connection) take the same path (although it is also possible to send segments of the same TCP connection via different paths, this segment "splifting" may have negative side effects). Exemplary criteria that can be used to select a path include the following: priority of the IP packet as set by the PK 284 (should be the most common criterion): Destination IP address; Source IP address; IP next protocol; TCP port numbers (which may apply to both the TCP destination and source port numbers); UDP port numbers (which may apply to both the UDP destination and source port numbers); and IP differentiated services (DS) field. Similar to selective TCP spoofing and prioritization, the PSK 284 may determine a path by using any field in the IP packet.

As with the prioritization criteria (rules) the AND and OR combination operators can be used to link criteria together. For example, using the AND combination operator, a rule can be defined to select a path for SNMP data received from a specific host. Also, the order in which the rules are specified may be significant. It is possible for a connection to match the criteria of multiple rules. Therefore, the PSK 286 can apply rules in the order specified by the operator, taking the action of the first rule that matches. A default rule may also be set which defines the action to be taken for IP packets which do not match any of the defined rules. The set of rules selected by the operator may be defined in a path selection profile.

By way of example, a path selection rule may select the path based on any of the following path information in which IP packets match the rule: a primary path, a secondary path, and a tertiary path. The primary path is be specified in any path selection rule. The secondary path is used only when the primary path has failed. If no secondary path is specified, any IP packets that match the rule can be discarded when the primary path fails. The tertiary path is specified only if a secondary path is specified. The tertiary path is selected if both the primary and secondary paths have failed. If no tertiary path is specified, any IP packets that match the rule can be discarded when both the primary and secondary paths fail. Path selection may be generalized such that the path selection rule can select up to N paths where the Nth path is used only if the (N−1)th path fails. The example above where N=3 is merely illustrative, although N is typically a fairly small number.

By way of example, the operation of the system 100 is described as follows. First, a backbone connection is established between the PEPs 200 of two network gateways 120, 140 (i.e., the two spoofers), located at each end of the backbone link 130 for which TCP spoofing is desired. Whenever an IP host 110 initiates a TCP connection, the TSK 280 of the PEP 200 local to the IP host 110 checks its configured selective TCP spoofing rules. If the rules indicate that the connection should not be spoofed, the PEP 200 allows the TCP connection to flow end-to-end unspoofed. If the rules indicate that the connection should be spoofed, the spoofing PEP 200 locally responds to the IP host's TCP three-way handshake. In parallel, the spoofing PEP 200 sends a message across the backbone link 130 to its partner network gateway 140 asking it to initiate a TCP three-way handshake with the IP host 150 on its side of the backbone link 130. Data is then exchanged between the IP host 110, 150 with the PEP 200 of the network gateway 120 locally acknowledging the received data and forwarding it across the backbone link 130 via the high speed backbone connection, compressing the data as appropriate based on the configured compression rules. The priority of the TCP connection is determined when the connection is established. The BPK 282 can multiplex the connection with other received connections over a single backbone connection, the PK 284 determines the priority of the connection and the PSK 286 determines the path the connection is to take.

The PEP 200, as described above, advantageously improves network performance by allocating TCP spoofing-related resources, such as buffer space, control blocks, etc., only to TCP connections for which spoofing is beneficial; by spoofing the three-way handshake to decrease data response time; by reducing the number of ACKs which are transmitted by performing local acknowledgement and by acknowledging multiple TCP connections with a single ACK; by performing data compression to increase the amount of data that can be transmitted; by assigning priorities to different connections; and by defining multiple paths for connections to be made.

Figure 3:
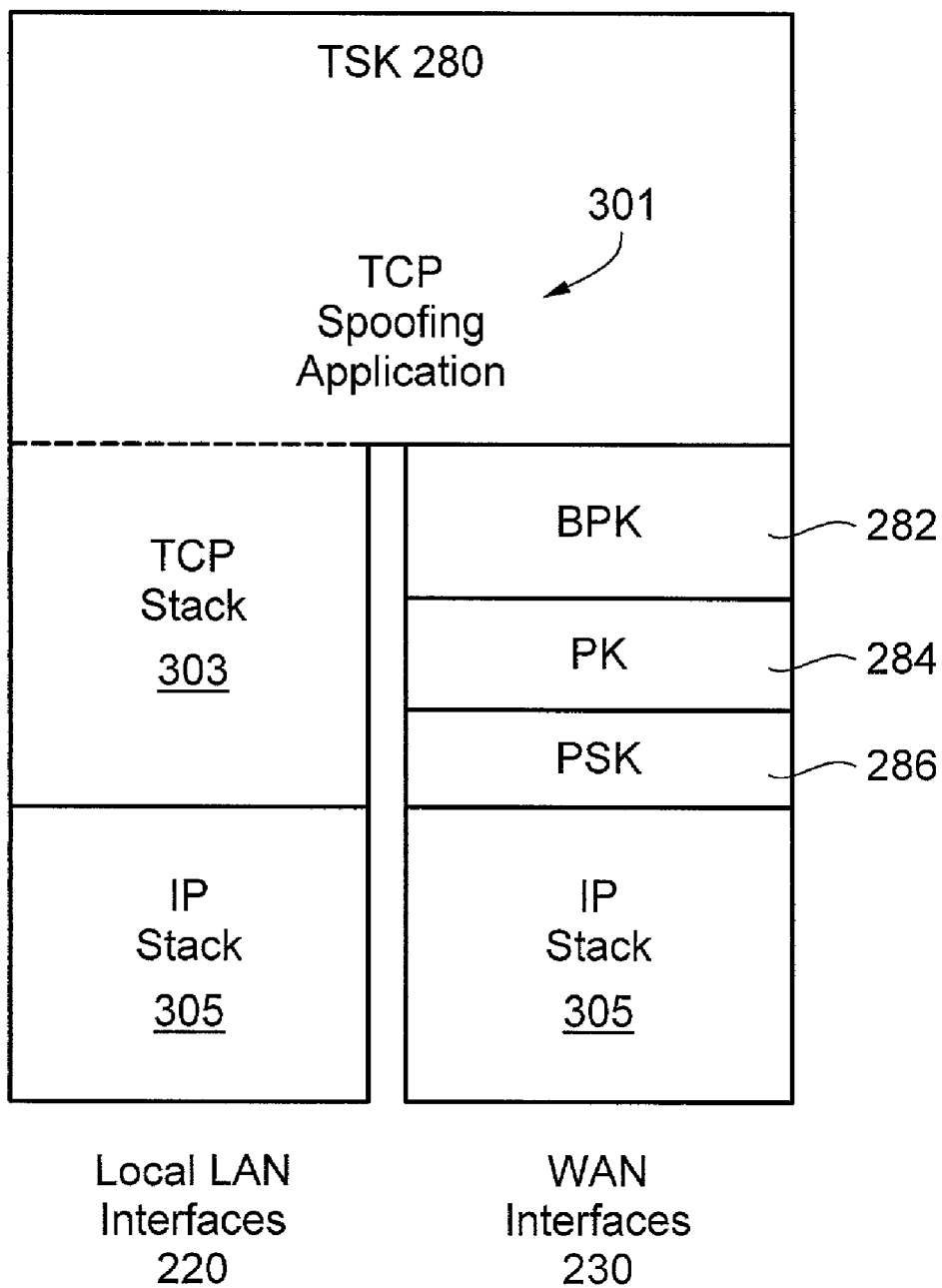
FIG. 3 is a diagram of a TCP Spoofing Kernel (TSK) utilized in the environment of FIG. 2.

FIG. 3 shows an exemplary stack, which illustrates the relationship between the TCP stack and the PEP kernels 280, 282, 284, 286 of the present invention. The TSK 280 is primarily responsible for functions related to TCP spoofing. The TSK 280, in an exemplary embodiment, includes two basic elements: a transport layer that encompasses a TCP stack 303 and an IP stack 305; and a TCP spoofing application 301. The transport layer is responsible for interacting with the TCP stacks (e.g., 303) of IP hosts 110 connected to a local LAN interface 220 of a PEP 210.

The TSK 280 implements the TCP protocol, which includes the appropriate TCP state machines and terminates spoofed TCP connections. The TCP spoofing application 301 rests on top of the transport layer and act as the application that receives data from and sends data to the IP hosts 110 applications. Because of the layered architecture of the protocol, the TCP spoofing application 301 isolates the details of TCP spoofing from the transport layer, thereby allowing the transport layer to operate in a standard fashion.

As shown in FIG. 3, the TCP spoofing application 301 can also interface to the BPK 282 associated with the WAN interfaces 230. The BPK 282 performs backbone protocol maintenance, implementing the protocol (or protocols) by which the network gateways 120, 140 (in FIG. 1) communicate. The BPK 282 provides reliable delivery of data, uses a relatively small amount of acknowledgement traffic, and supports generic backbone use (i.e., use not specific to the TSK 280). An example of a protocol implemented by BPK 282 is the reliable data protocol (RDP).

The BPK 282 lies above the PK 284 and the PSK 286, according to an exemplary embodiment. The PK 284 is responsible for determining the priority of IP packets and then allocating transmission opportunities based on priority. The PK 284 can also control access to buffer space by controlling the queue sizes associated with sending and receiving IP packets. The PSK 286 determines which path an IP packet should take to reach its destination. The path selected by the PSK 286 can be determined applying path selection rules. PSK 286 may also determine which IP packet should be forwarded using an alternate path and which packets should be dropped when one or more primary paths fail. It is noted that the above-arrangement is merely exemplary; other arrangements would be evident to one skilled in the art.

Figure 4A:
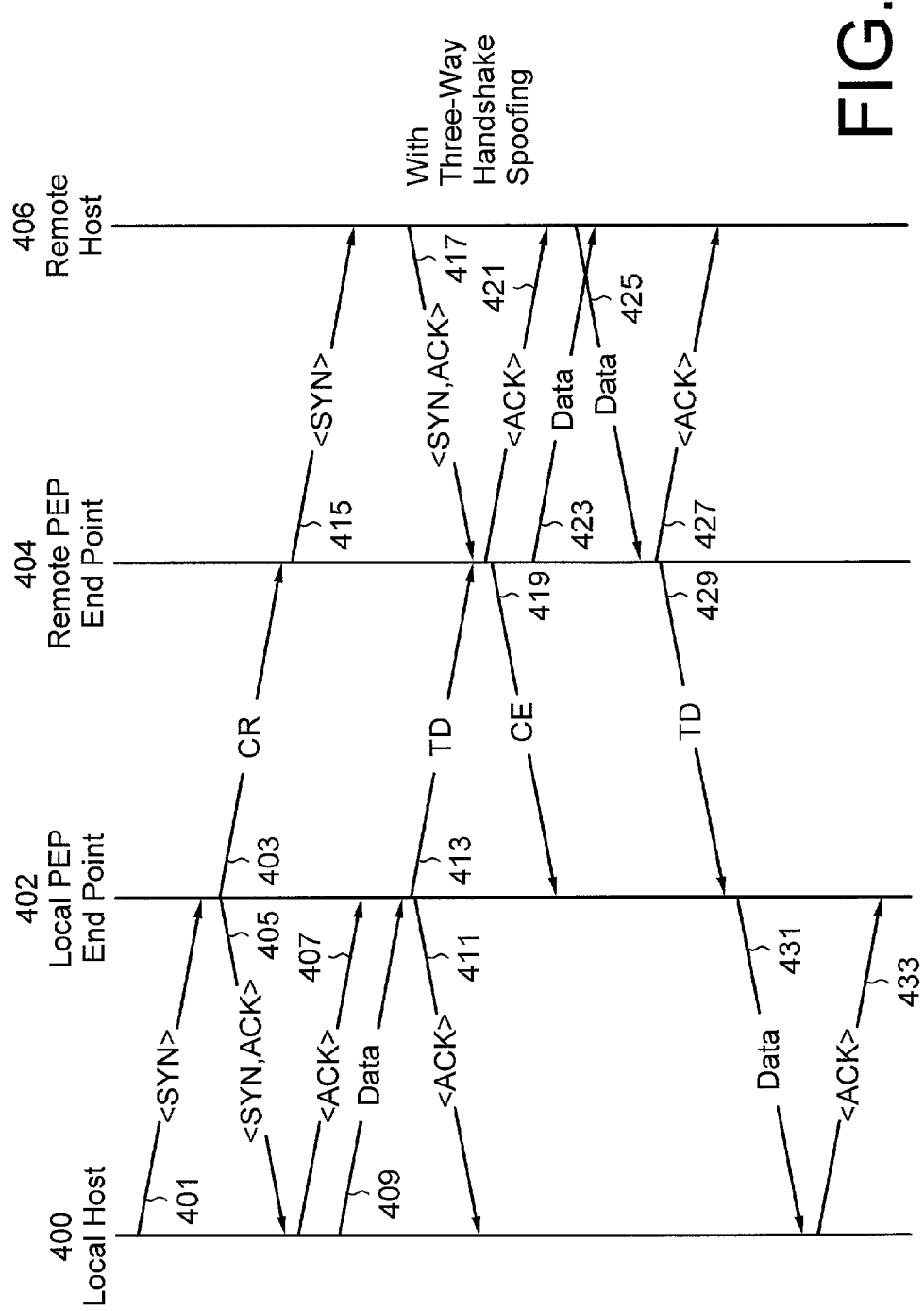
FIGS. 4A and 4B are flow diagrams of the connection establishment with three-way handshake spoofing and without three-way handshake spoofing, respectively.
Figure 4B:
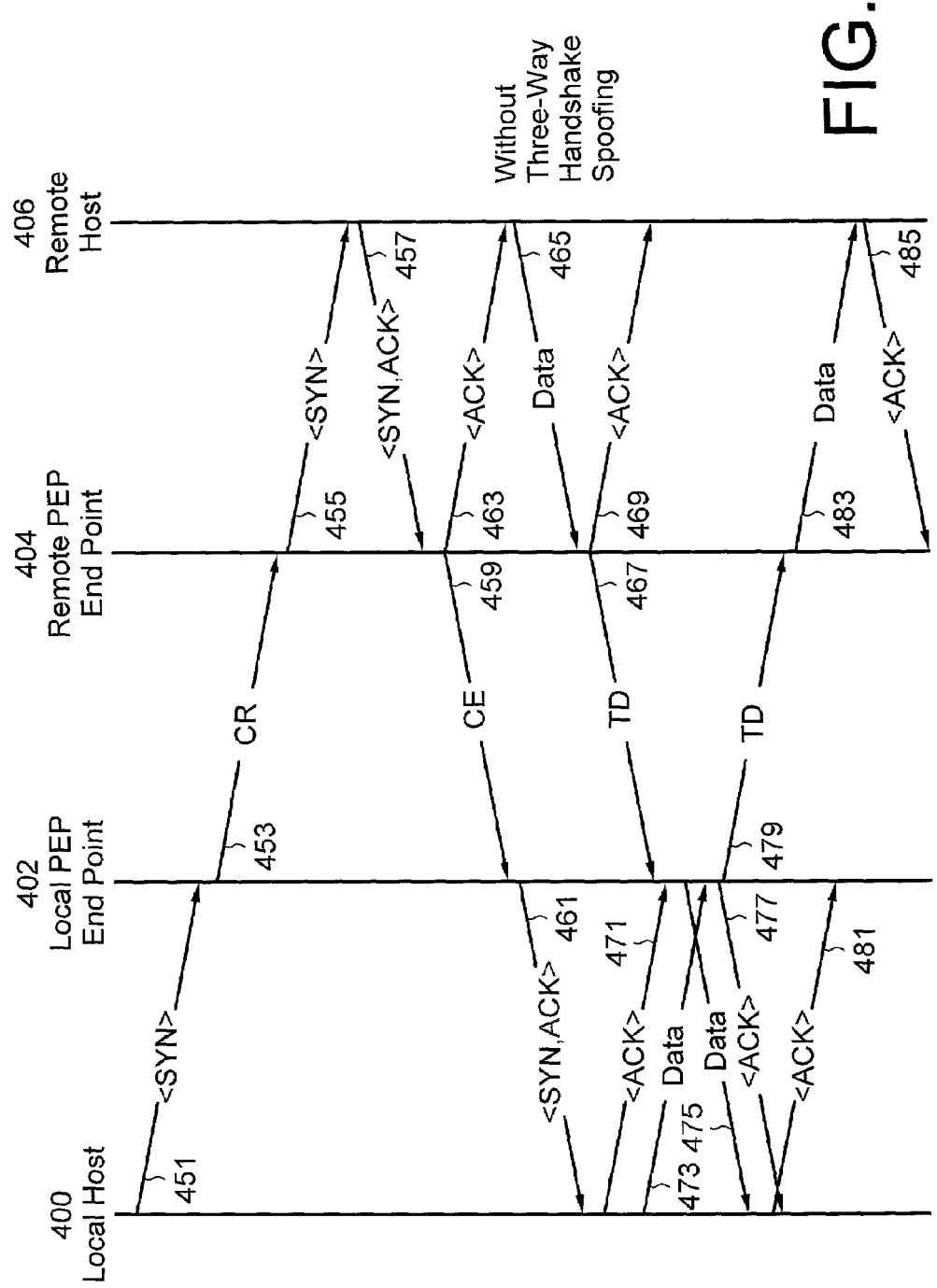

FIGS. 4A and 4B show flow diagrams of the establishment of a spoofed TCP connection utilizing three-way handshake spoofing and without three-way handshake spoofing, respectively. The TCP Spoofing Kernel 280 establishes a spoofed TCP connection when a TCP <SYN> segment is received from its local LAN or a Connection Request message from its TSK peer. It is noted that the three-way handshake spoofing may be disabled to support an end to end maximum segment size (MSS) exchange, which is more fully described below. For the purpose of explanation, the spoofed TCP connection establishment process is described with respect to a local host 400, a local PEP end point 402, a remote PEP end point 404, and a remote host 406. As mentioned previously, the TSK 280 within each of the PEP end points 402 and 404 provides the spoofing functionality.

In step 401, the local host 400 transmits a TCP <SYN> segment to the local PEP end point 402 at a local LAN interface 220. When a TCP segment is received from the local LAN interface 220, the platform environment 402 determines whether there is already a connection control block (CCB) assigned to the TCP connection associated with the TCP segment. If there is no CCB, the environment 402 checks whether the TCP segment is a <SYN> segment that is being sent to a non-local destination. If so, the <SYN> segment represents an attempt to bring up a new (non-local) TCP connection, and the environment 402 passes the segment to the TCP Spoofing Kernel 280 to determine the TCP connection's disposition. When a TCP <SYN> segment is received from the local LAN interface 220 for a new TCP connection, the TCP Spoofing Kernel 280 first determines if the connection should be spoofed. If the connection should be spoofed, TSK 280 uses (in an exemplary embodiment) the priority indicated in the selected TCP spoofing parameter profile and the peer index (provided by the environment 210 with the TCP <SYN> segment) to construct the handle of the backbone connection which should be used to carry this spoofed TCP connection. In the exemplary embodiment, the peer index is used as the 14 high order bits of the handle and the priority is used as the two low order bits of the handle. The backbone connection handle is then used (via the TSK control block (TCB) mapping table) to find the TCB associated with the backbone connection. TSK 280 of PEP end point 402 then checks whether the backbone connection is up. If the backbone connection is up, TSK 280 determines whether the number of spoofed TCP connections that are already using the selected backbone connection is still currently below the TCP connection control block (CCB) resource limit. The CCB resource limit is the smaller of the local number of CCBs (provided as a parameter by the platform environment 210) and the peer number of CCBs (received in the latest TSK peer parameters (TPP) message from the TSK peer) available for this backbone connection. If the number of connections is still below the limit, TSK 280 of PEP end point 402 assigns a unique TCP connection identifier (e.g., a free CCB mapping table entry index) to the connection and calls the environment 210 to allocate a TCP connection control block for the connection.

TSK 280 of PEP end point 402 returns the TCP <SYN> segment back to the environment 210 to be forwarded unspoofed if any of the above checks fail. In other words, the following conditions result in the TCP connection being unspoofed. First, if the selective TCP spoofing rules indicate that the connection should not be spoofed. Also, there is no backbone connection for the priority at which the TCP connection should be spoofed (indicated by the absence of a TCB for the backbone connection). No spoofing is performed if the backbone connection is down. Additionally, if the number of spoofed TCP connections that are already using the backbone connection reaches or exceeds a predetermined threshold, then no spoofing is performed. Further, if there is no CCB mapping table entry available or there is no CCB available from the CCB free pool, then the TCP connection is forwarded unspoofed. For the case in which there is no backbone connection, TSK 280 of PEP end point 402 may also post an event to alert the operator that there is a mismatch between the configured TCP spoofing parameter profiles and the configured set of backbone connections.

Continuing with the example, if all of the above checks pass, TSK 280 of PEP end point 402 writes the backbone connection handle into the buffer holding the TCP <SYN> segment. It is noted that this is not done until a CCB is successfully allocated by the platform environment 402, because the environment does not count the buffer unless a CCB is successfully allocated. TSK 280 then copies the parameters from the selected TCP spoofing parameter profile into the CCB. Consequently, relevant information (e.g., the maximum segment size that is advertised by the host (if smaller than the configured MSS), the initial sequence number, and etc.) is copied out of the TCP <SYN> segment and stored in the CCB. It is noted that the source and destination IP addresses and source and destination TCP port numbers will already have been placed into the CCB by the platform environment 402 when the CCB was allocated; the environment 402 uses this information to manage CCB hash function collisions.

After allocating and setting up the CCB, the TCP Spoofing Kernel 280 of PEP end point 402 constructs a Connection Request (CR) message, per step 403, and sends it to its TSK peer associated with the remote PEP end point 404. The CR message basically contains all of the information extracted from the TCP spoofing parameter profile and the TCP <SYN> segment and stored in the local CCB, e.g., the source and destination IP addresses, the source and destination TCP port numbers, the MSS value, etc., with the exception of fields that have only local significance, such as the initial sequence number. (The IP addresses and TCP port numbers are placed into a TCP connection header.) In other words, the CR message contains all of the information that the peer TSK of PEP end point 404 requires to set up its own CCB. To complete the local connection establishment, the TCP Spoofing Kernel 280 of the local PEP end point 402 sends a TCP <SYN,ACK> segment to the local host 400 in response to the <SYN> segment received, per step 405. TSK 280 of PEP end point 402 performs step 405 simultaneously with the step of sending the Connection Request message (i.e., step 403), if three-way handshake spoofing is enabled. Otherwise, TSK 280 of 402 waits for a Connection Established (CE) message from its TSK peer of the remote PEP end point 404 before sending the <SYN,ACK> segment. In an exemplary embodiment, TSK 280 of PEP end point 402 selects a random initial sequence number (as provided in IETF (Internet Engineering Task Force) RFC 793, which is incorporated herein by reference in its entirety) to use for sending data.

If three-way handshake spoofing is disabled, the MSS value sent in the <SYN,ACK> segment is set equal to the MSS value received in the CE message. If three-way handshake spoofing is enabled, the MSS value is determined from the TCP spoofing parameter profile selected for the connection (and the configured path maximum transmission unit (MTU)). For this case, TSK 280 of PEP end point 402 then compares the MSS value received in the Connection Established message, when it arrives, to the value it sent to the local host in the TCP <SYN,ACK> segment. If the MSS value received in the CE message is smaller than the MSS value sent to the local host, a maximum segment size mismatch exists. (If an MSS mismatch exists, TSK may need to adjust the size of TCP data segments before sending them.) After sending the TCP <SYN,ACK> segment (step 405), TSK 280 of the local PEP end point 402 is ready to start accepting data from the local host 400. In step 407, the local host 400 transmits an <ACK> segment to the TSK 280 of PEP end point 402; thereafter, the local host forwards, as in step 409 data to the TSK 280 of PEP end point 402 as well. When three-way handshake spoofing is being used, TSK 280 does not need to wait for the Connection Established message to arrive from its TSK peer before accepting and forwarding data. As seen in FIG. 4A, in step 411, TSK 280 of the local PEP end point 402 sends an <ACK> segment to the local host and simultaneously sends the TCP data (TD) from the local host 400 to the peer TSK of PEP end point 404 (per step 413) prior to receiving a CE message from the peer TSK of PEP end point 404.

However, TSK 280 of PEP end point 402 does not accept data from its TSK peer of PEP end point 404 until after the CE message has been received. TSK 280 of PEP end point 402 does not forward any data received from its TSK peer of PEP end point 404 to the local host 400 until it has received the TCP <ACK> segment indicating that the local host has received the <SYN,ACK> segment (as in step 407).

When a Connection Request message is received from a peer TSK (step 403), the TCP Spoofing Kernel 280 allocates a CCB for the connection and then stores all of the relevant information from the CR message in the CCB. TSK 280 of PEP end point 404 then uses this information to generate a TCP <SYN> segment, as in step 415, to send to the remote host 406. The MSS in the <SYN> segment is set to the value received from the TSK peer of PEP end point 404. When the remote host responds with a TCP <SYN,ACK> segment (step 417), TSK 280 of PEP end point 402 sends a Connection Established message to its TSK peer of the remote PEP end point 404 (step 419), including in the CE message the MSS that is sent by the local host in the <SYN,ACK> segment. TSK 280 of PEP end point 402 also responds, as in step 421, with a TCP <ACK> segment to complete the local three-way handshake. The peer TSK of PEP end point 404 then forwards the data that is received from TSK 280 to the host, per step 423. Concurrently, in step 425, the remote host 406 sends data to the peer TSK of PEP end point 404, which acknowledges receipt of the data by issuing an <ACK> segment to the remote PEP end point 404, per step 427. Simultaneously with the acknowledgement, the data is sent to TSK 280 of PEP end point 402 (step 429).

At this point, TSK 280 is ready to receive and forward data from either direction. TSK 280 forwards the data, as in step 431 to the local host, which, in turn, sends an <ACK> segment (step 433). If the data arrives from its TSK peer before a <SYN,ACK> segment response is received from the local host, the data is queued and then sent after the <ACK> segment is sent in response to the <SYN,ACK> segment (when it arrives).

Turning now to FIG. 4B, a spoofed TCP connection is established with the three-way handshake spoofing disabled. Under this scenario, the local host 400 transmits a TCP <SYN> segment, as in step 451, to the TSK 280 within the local PEP end point 402. Unlike the TCP connection establishment of FIG. 4A, the local PEP end point 402 does not respond to the a TCP <SYN> segment with a <SYN,ACK> segment, but merely forwards a CR message to the remote PEP end point 404 (step 453). Next, in step 455, sends a TCP <SYN> segment to the remote host 406. In response, the remote host 406 transmit a TCP <SYN,ACK> segment back to the remote PEP end point 404 (per step 457). Thereafter, the remote PEP end point 404, as in step 459, forwards a CE message to the local PEP end point 402, which subsequently issues a <SYN,ACK> segment to the local host 400, per step 461. Simultaneous with step 459, the remote PEP end point 404 issues an <ACK> segment to the remote host 406 (step 463).

Upon receiving the <ACK> segment, the remote host 406 may begin transmission of data, as in step 465. Once the PEP end point 404 receives the data from the remote host 406, the remote PEP end point 404 simultaneously transmits, as in step 467, the TD message to the local PEP end point 402 and transmits an <ACK> segment to the remote host 406 to acknowledge receipt of the data (step 469).

Because the local host 400 has received a <SYN,ACK> segment from the local PEP end point 402, the local host 400 acknowledges the message, per step 471. Thereafter, the local host 400 transmits data to the local PEP end point 402. In this example, before the local PEP end point 402 receives the data from the local host 400, the local PEP end point 402 forwards the data that originated from the remote host 406 via the TD message (step 467) to the local host 400, per step 475.

In response to the data received (in step 473), the local PEP end point 402 issues an <ACK> segment, as in step 477, and forwards the data in a TD message to the remote PEP end point 404, per step 479. The local host 400 responds to the received data of step 475 with an <ACK> segment to the local PEP end point 402 (step 481). The remote PEP end point 404 sends the data from the local host 400, as in step 483, upon receipt of the TD message. After receiving the data, the remote host 406 acknowledges receipt by sending an <ACK> segment back to the remote PEP end point 404, per step 485.

FIG. 5 shows the flow of packets with the PEP architecture, according to one embodiment of the present invention. As shown, a communication system 500 includes a hub site (or local) PEP end point 501 that has connectivity to a remote site PEP end point 503 via a backbone connection. By way of example, at the hub site (or local site) and at each remote site, PEP end points 501 and 503 handle IP packets. PEP end point 501 includes an Internal IP packet routing module 501*a* that receives local IP packets and exchanges these packets with a TSK 501*b* and a BPK 501*c*. Similarly, the remote PEP end point 503 includes an internal IP packet routing module 503*a* that is in communication with a TSK 503*b* and a BPK 503*c*. Except for the fact that the hub site PEP end point 501 may support many more backbone protocol connections than a remote site PEP end point 503, hub and remote site PEP processing is symmetrical.

For local-to-WAN traffic (i.e., upstream direction), the PEP end point 501 receives IP packets from its local interface 220 (FIG. 2). Non-TCP IP packets are forwarded (as appropriate) to the WAN interface 230 (FIG. 2). TCP IP packets are internally forwarded to TSK 501*b*. TCP segments which belong to connections that are not be spoofed are passed back by the spoofing kernel 501*b* to the routing module 501*a* to be forwarded unmodified to the WAN interface 230. For spoofed TCP connections, the TCP spoofing kernel 501*a* locally terminates the TCP connection. TCP data that is received from a spoofed connection is passed from the spoofing kernel 501*a* to the backbone protocol kernel 501*c*, and then multiplexed onto the appropriate backbone protocol connection. The backbone protocol kernel 501*c* ensures that the data is delivered across the WAN.

For WAN-to-local traffic (i.e., downstream direction), the remote PEP end point 503 receives IP packets from its WAN interface 230 (FIG. 2). IP packets that are not addressed to the end point 503 are simply forwarded (as appropriate) to the local interface 220 (FIG. 2). IP packets addressed to the end point 503, which have a next protocol header type of "PBP" are forwarded to the backbone protocol kernel 503c. The backbone protocol kernel 503c extracts the TCP data and forwards it to the TCP spoofing kernel 503b for transmission on the appropriate spoofed TCP connection. In addition to carrying TCP data, the backbone protocol connection is used by the TCP spoofing kernel 501b to send control information to its peer TCP spoofing kernel 503b in the remote PEP end point 503 to coordinate connection establishment and connection termination.

Prioritization may be applied at four points in the system 500 within routing 501a and TSK 501b of PEP end point 501, and within routing 503a, and TSK 503b of PEP end point 503. In the upstream direction, priority rules are applied to the packets of individual TCP connections at the entry point to the TCP spoofing kernel 501b. These rules allow a customer to control which spoofed applications have higher and lower priority access to spoofing resources. Upstream prioritization is also applied before forwarding packets to the WAN. This allows a customer to control the relative priority of spoofed TCP connections with respect to unspoofed TCP connections and non-TCP traffic (as well as to control the relative priority of these other types of traffic with respect to each other). On the downstream side, prioritization is used to control access to buffer space and other resources in the PEP end point 503, generally and with respect to TCP spoofing.

At the hub (or local) site, the PEP end point 501 may be implemented in a network gateway (e.g. an IP Gateway), according to one embodiment of the present invention. At the remote site, the PEP end point 503 may be implemented in the remote site component, e.g. a satellite terminal such as a Multimedia Relay, a Multimedia VSAT or a Personal Earth Station (PES) Remote.

The architecture of system 500 provides a number of advantages. First, TCP spoofing may be accomplished in both upstream and downstream directions. Additionally, the system supports spoofing of TCP connection startup, and selective TCP spoofing with only connections that can benefit from spoofing actually spoofed. Further, system 500 enables prioritization among spoofed TCP connections for access to TCP spoofing resources (e.g., available bandwidth and buffer space). This prioritization is utilized for all types of traffic that compete for system resources.

With respect to the backbone connection, the system 500 is suitable for application to a satellite network as the WAN. That is, the backbone protocol is optimized for satellite use in that control block resource requirements are minimized, and efficient error recovery for dropped packets are provided. The system 500 also provides a feedback mechanism to support maximum buffer space resource efficiency. Further, system 500 provides reduced acknowledgement traffic by using a single backbone protocol ACK to acknowledge the data of multiple TCP connections.

Figure 6:
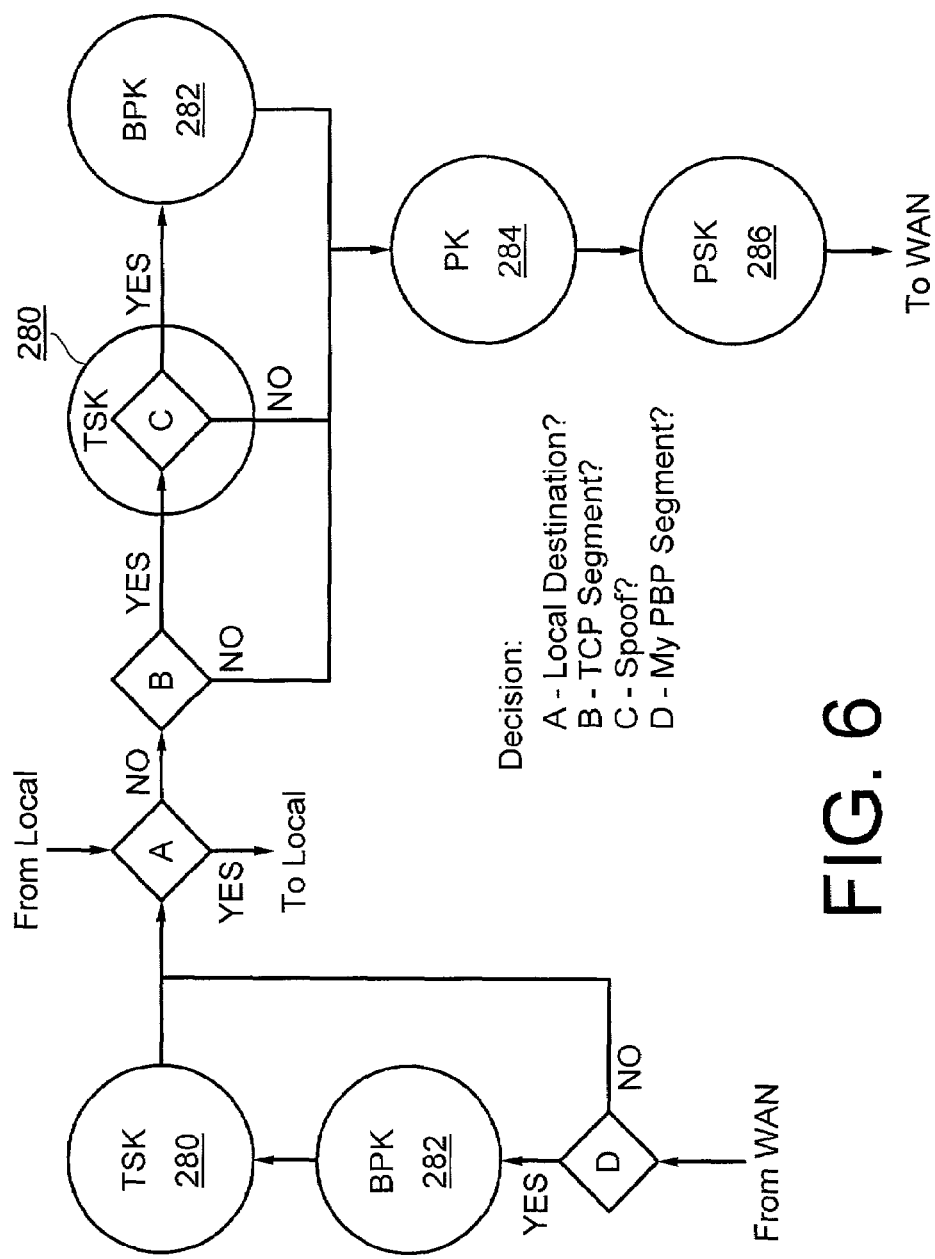
FIG. 6 is a diagram of an IP (Internet Protocol) packet flow through a PEP end point, in accordance with an embodiment of the present invention.

FIG. 6 illustrates the flow of IP packets through a PEP end point, according to an embodiment of the present invention. When IP packets are received at the local LAN interface 220, the PEP end point 210 determines (as shown by decision point A), whether the packets are destined for a host that is locally situated; if so, the IP packets are forwarded to the proper local LAN interface 220. If the IP packets are destined for a remote host, then the PEP end point 210 decides, per decision point B, whether the traffic is a TCP segment. If the PEP end point 210 determines that in fact the packets are TCP segments, then the TSK 280 determines whether the TCP connection should be spoofed. However, if the PEP end point 210 determines that the packets are not TCP segments, then the BPK 282 processes the traffic, along with the PK 284 and the PSK 286 for eventual transmission out to the WAN. It should be noted that the BPK 282 does not process unspoofed IP packets; i.e., the packets flow directly to PK 284. As seen in FIG. 6, traffic that is received from the WAN interface 230 is examined to determine whether the traffic is a proper PBP segment (decision point D) for the particular PEP end point 210; if the determination is in the affirmative, then the packets are sent to the BPK 282 and then the TSK 280.

Routing support includes routing between the ports of the PEP End Point 210 (FIG. 2), e.g., from one Multimedia VSAT LAN port to another. Architecturally, the functionalities of TCP spoofing, prioritization and path selection, fit between the IP routing functionality and the WAN. PEP functionality need not be applied to IP packets which are routed from local port to local port within the same PEP End Point 210. TCP spoofing, prioritization and path selection are applied to IP packets received from a local PEP End Point interface that have been determined to be destined for another site by the routing function.

Figure 7:
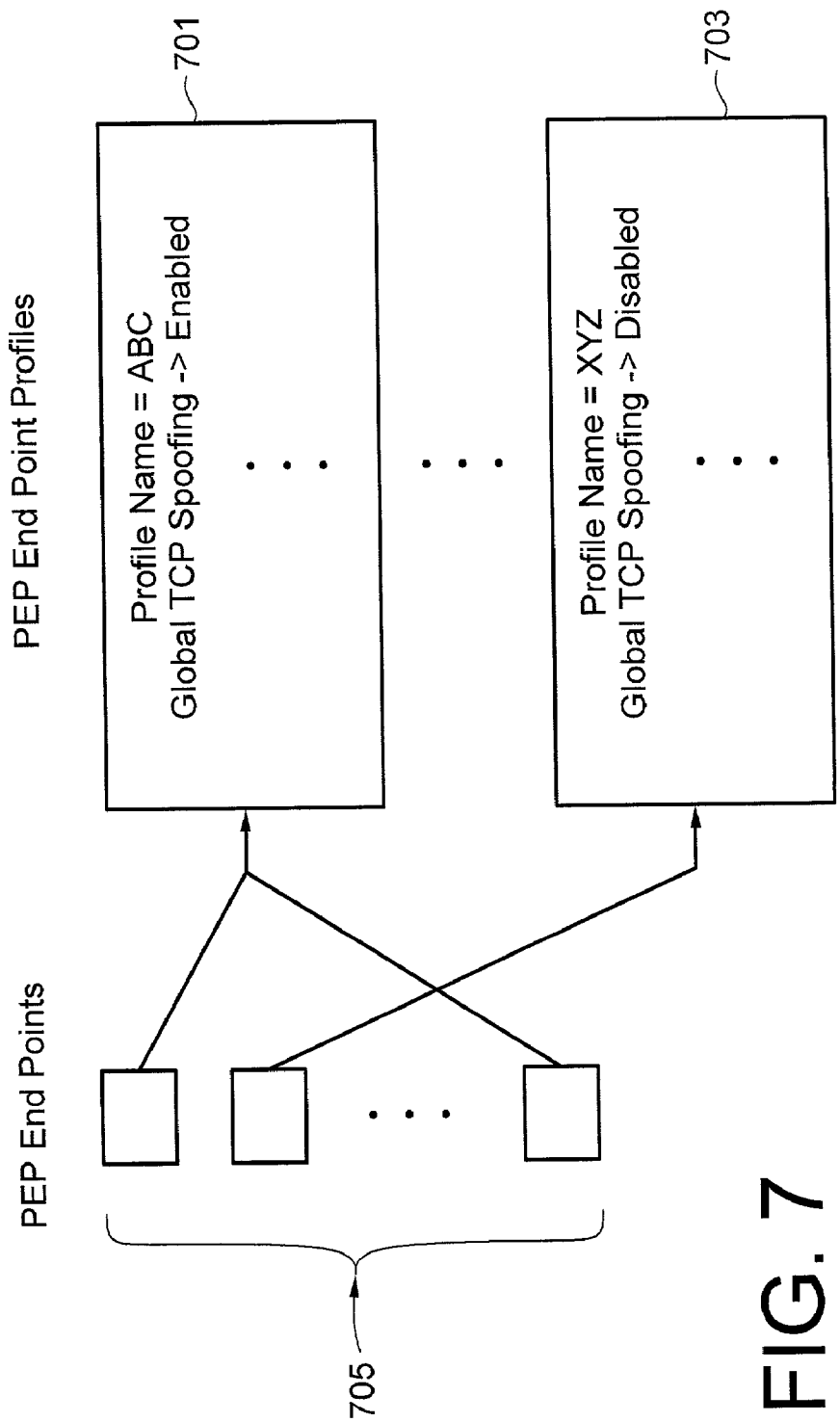
FIG. 7 is a diagram of PEP end point profiles utilized in the platform of FIG. 2.

FIG. 7 shows the relationship between PEP End Points and PEP End Point profiles, in accordance with an embodiment of the present invention. PEP parameters are primarily configured via a set of profiles 701 and 703, which are associated with one or more PEP end points 705. In an exemplary embodiment, PEP parameters are configured on a per PEP End Point basis, such as whether TCP spoofing is globally enabled. These parameters are configured in the PEP End Point profiles 701 and 703. It is noted that parameters that apply to specific PEP kernels may be configured via other types of profiles. Profiles 701 and 703 are a network management construct; internally, a PEP End Point 705 processes a set of parameters that are received via one or more files.

Whenever the PEP End Point 705 receives new parameters, the platform environment compares the new parameters to the existing parameters, figures out which of the PEP kernels are affected by the parameter changes, and then passes the new parameters to the affected kernels. In an exemplary embodiment, all parameters are installed dynamically. With the exception of parameters that are component specific (such as the IP addresses of a component), all parameters may be defined with default values.

As mentioned previously, the PEP end point 210 may be implemented in a number of different platforms, in accordance with the various embodiments of the present invention. These platforms may include an IP gateway, a Multimedia Relay, a Multimedia VSAT (Very Small Aperture Terminal), and a Personal Earth Station (PES) Remote, as shown in FIGS. 8–11, respectively. In general, as discussed in FIG. 2, the PEP end point 210 defines a local LAN interface 220 as an interface through which the PEP End Point 210 connects to IP hosts located at the site. A WAN interface 230 is an interface through which the PEP End Point 210 connects to other sites. It is noted that a WAN interface 230 can physically be a LAN port. FIGS. 8–11, below, describe the specific LAN and WAN interfaces of the various specific PEP End Point platforms. The particular LAN and WAN interfaces that are employed depend on which remote site PEP End Points are being used, on the configuration of the hub and remote site PEP End Points and on any path selection rules which may be configured.

Figure 8:
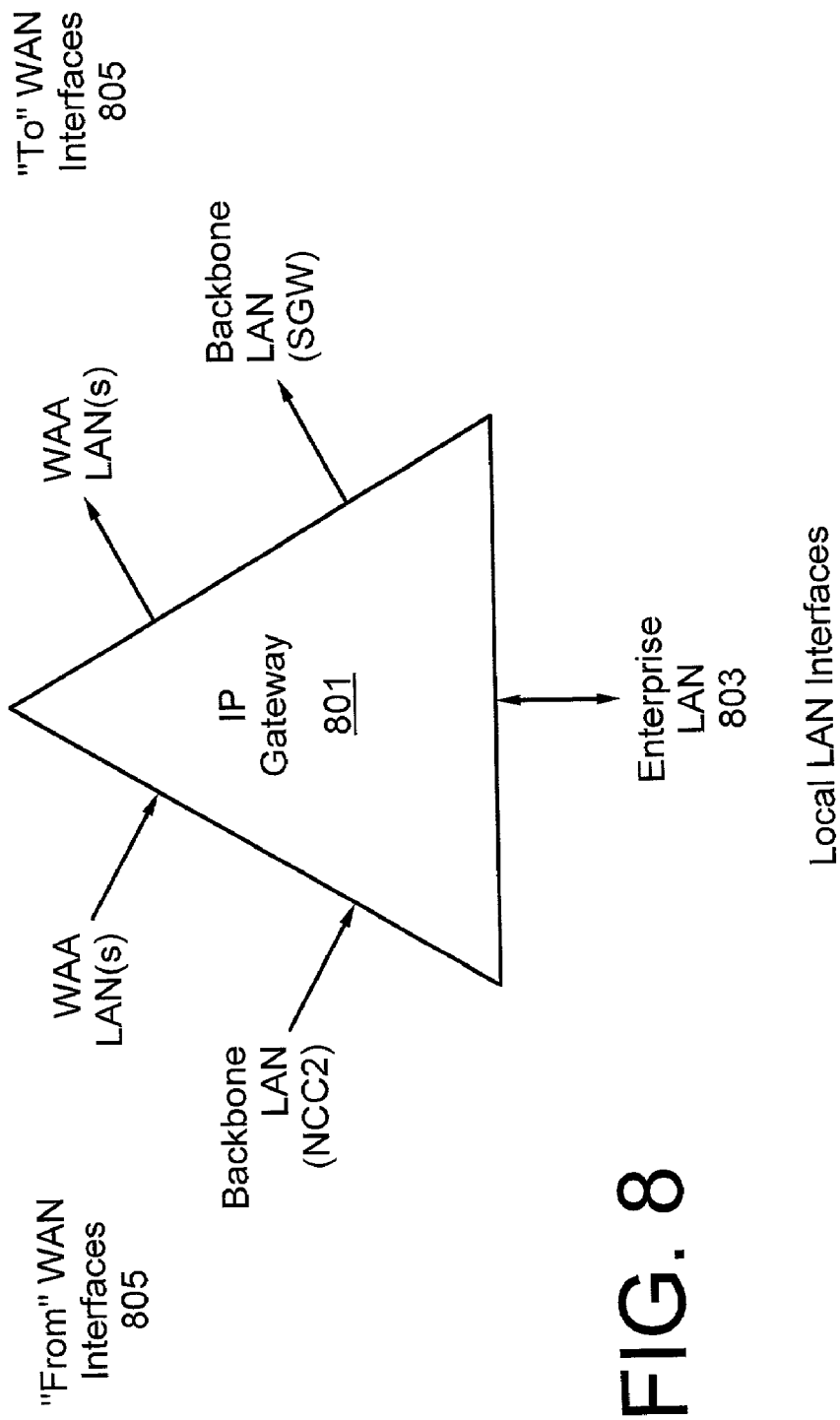
FIG. 8 is a diagram of the interfaces of a PEP end point implemented as an IP gateway, according to an embodiment of the present invention.

FIG. 8 shows the interfaces of the PEP end point implemented as an IP gateway, according to one embodiment of the present invention. By way of example, an IP Gateway 801 has a single local LAN interface, which is an enterprise interface 803. The IP Gateway 803 employs two WAN interfaces 805 for sending and receiving IP packets to and from remote site PEP End Points: a backbone LAN interface and a wide area access (WAA) LAN interface.

The backbone LAN interface 805 is used to send IP packets to remote site PEP End Points via, for example, a Satellite Gateway (SGW) and a VSAT outroute. A VSAT outroute can be received directly by Multimedia Relays (FIG. 9) and Multimedia VSATs (FIG. 10) (and is the primary path used with these End Points); however, IP packets can also be sent to a PES Remote (FIG. 11) via a VSAT outroute.

Figure 9:
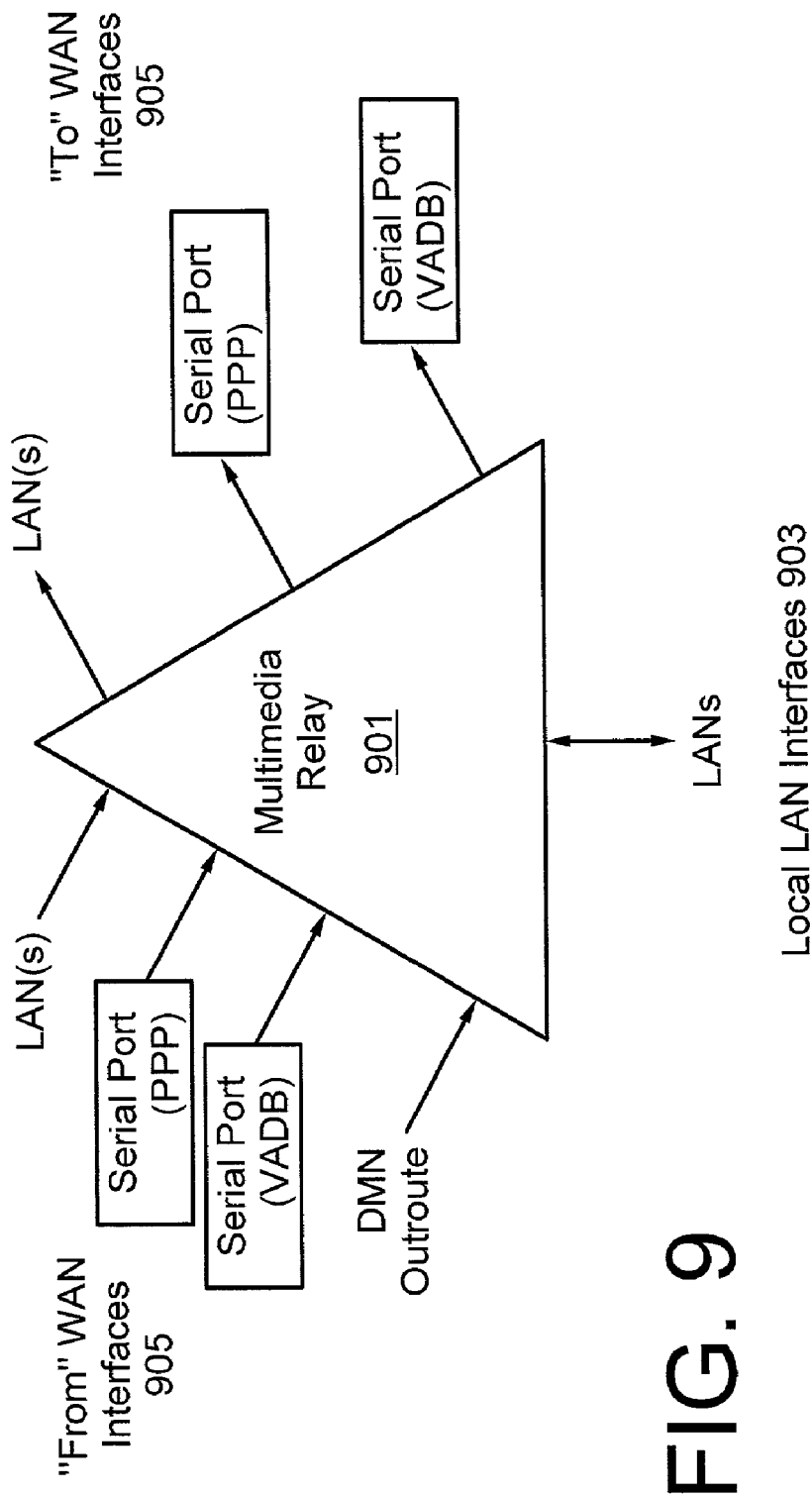
FIG. 9 is a diagram of the interfaces of a PEP end point implemented as a Multimedia Relay, according to an embodiment of the present invention.

FIG. 9 shows a Multimedia Relay implementation of a PEP end point, in accordance with an embodiment of the present invention. A Multimedia-Relay has two or three local LAN interfaces 903. A Multimedia Relay 901 has up to two WAN interfaces 905 for sending IP packets to hub site PEP End Points: one of its LAN interfaces and a PPP serial port interface, and four or five interfaces for receiving IP packets from hub site PEP End Points, a VSAT outroute, all of its LAN interfaces, and a PPP serial port interface. It is noted that a PPP (Point-to-Point Protocol) serial port interface and a LAN interface are generally not be used at the same time.

A Multimedia Relay 901 supports the use of all of its LAN interfaces 903 at the same time for sending and receiving IP packets to and from hub site PEP End Points. Further, a Multimedia Relay elements 905 supports the use of a VADB (VPN Automatic Dial Backup) serial port interface for sending and receiving IP packets to and from the hub site PEP End Points.

Figure 10:
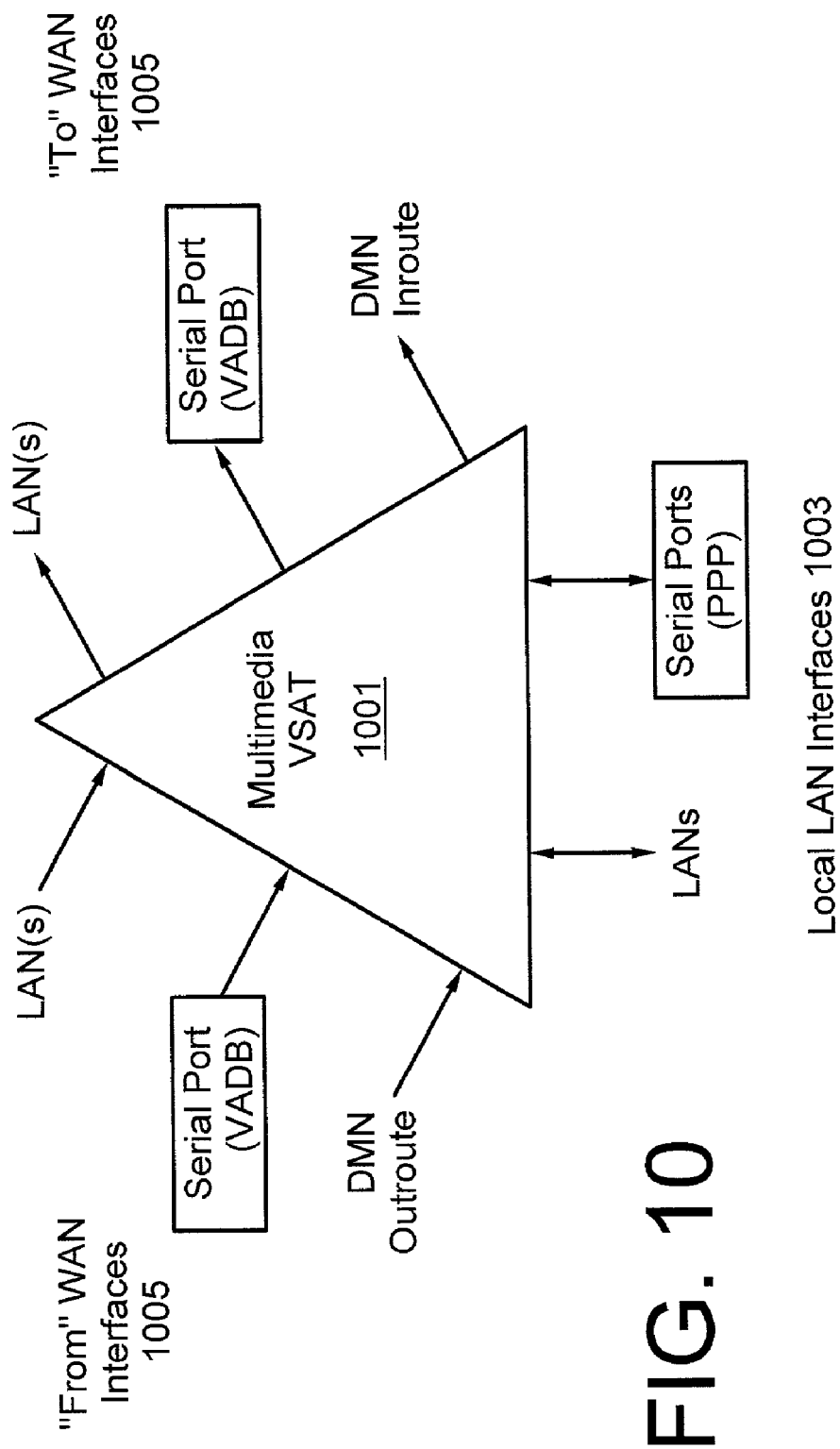
FIG. 10 is a diagram of the interfaces of a PEP end point implemented as a Multimedia VSAT (Very Small Aperture Terminal), according to an embodiment of the present invention.

FIG. 10 shows a Multimedia VSAT implementation of the PEP end point, according to one embodiment of the present invention. A Multimedia VSAT 1001, in an exemplary embodiment, has two local LAN interfaces 1003. Support for one or more local PPP serial port interfaces may be utilized. The Multimedia VSAT 1001 has two WAN interfaces 1005 for sending IP packets to hub site PEP End Points: a VSAT inroute and one of its LAN interfaces. The Multimedia VSAT 1001 thus has three interfaces for receiving IP packets from hub site PEP End Points, the VSAT outroute and both of its LAN interfaces 1003. A Multimedia VSAT 1003 may support uses of both of its LAN interfaces 1003 at the same time for sending and receiving IP packets to and from hub site PEP End Points. The Multimedia VSAT 1003 further supports the use of a VADB serial port interface for sending and receiving IP packets to and from the hub site PEP End Points.

Figure 11:
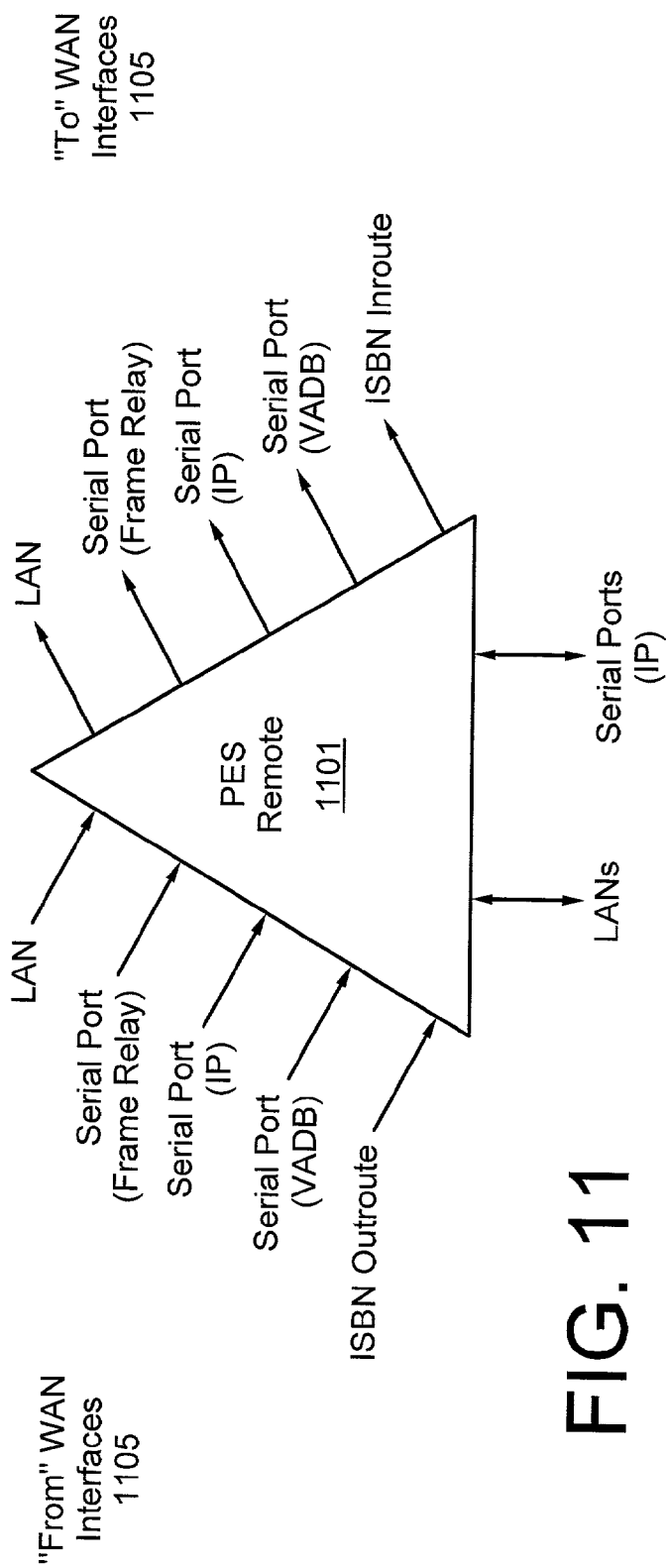
FIG. 11 is a diagram of the interfaces of a PEP end point implemented in an earth station, according to an embodiment of the present invention.

FIG. 11 shows a PES Remote implementation of a PEP end point, according to one embodiment of the present invention. A PES Remote 1101 may have a local LAN interface and/or several local IP (e.g. PPP, SLIP, etc.) serial port interfaces, collectively denoted as LAN interfaces 1103. The particular LAN interfaces 1103 depend on the specific PES Remote platform. PES Remote 1101, in an exemplary embodiment, has up to five WAN interfaces 1105 for sending IP packets to hub site PEP End Points, an ISBN inroute, a LAN interface, a VADB serial port interface, a Frame Relay serial port interface and an IP serial port interface, and up to five existing interfaces for receiving IP packets from hub site PEP End Points: an ISBN outroute, a LAN interface, a VADB serial port interface, a Frame Relay serial port interface, and an IP serial port interface. The physical Frame Relay serial port interface may be supporting multiple Permanent Virtual Circuits (PVCs); some of which are equivalent to local interfaces 1103 and some of which are WAN interfaces 1105.

The Backbone Protocol Kernel 282 is described below. Note that although the BPK 282 is discussed in terms of interaction with the TCP Spoofing Kernel 280, the BPK 282 is generic enough to support the use of PBP backbone connections for applications other than TCP spoofing. An example of such an application is to support the use of a stateful compression algorithm for the backbone link. Stateful compression algorithms generally require error free links. A backbone protocol can be used to turn a link that might otherwise lose packets due to bit errors into an error free link.

BPK 282 parameters can be configured via profiles. BPK 282 parameters can be defined in PEP End Point profiles. Exemplary PEP End Point profiles 701, 703 are described above in conjunction with FIG. 7. Which PEP End Point profile 701, 703 is being used by a PEP End Point 705 can be configured as part of an individual PEP End Point's specific configuration.

Profiles are a network management construct. BPK 282 can receive its parameters as a data structure passed to BPK 282 by the platform environment 210. Parameters which apply to BPK 282 itself and to all backbone connections can be specified once. Parameters related to individual backbone connections can be provided to BPK 282 by the platform environment when the connection is opened. The platform environment 210, in turn, can receive all of the parameters via files sent to it by a network manager.

The BPK 282 can receive parameters from the platform environment 210 at startup and whenever the platform environment receives new parameters which include changes to BPK 282 related parameters. When BPK 282 receives new parameters, it can compare the new parameters to the existing parameters and then take action to install the new parameters based on which parameters have changed. In general, all parameters can be installed dynamically. However, in some cases, parameter changes may require that a backbone connection be restarted.

Figure 12:
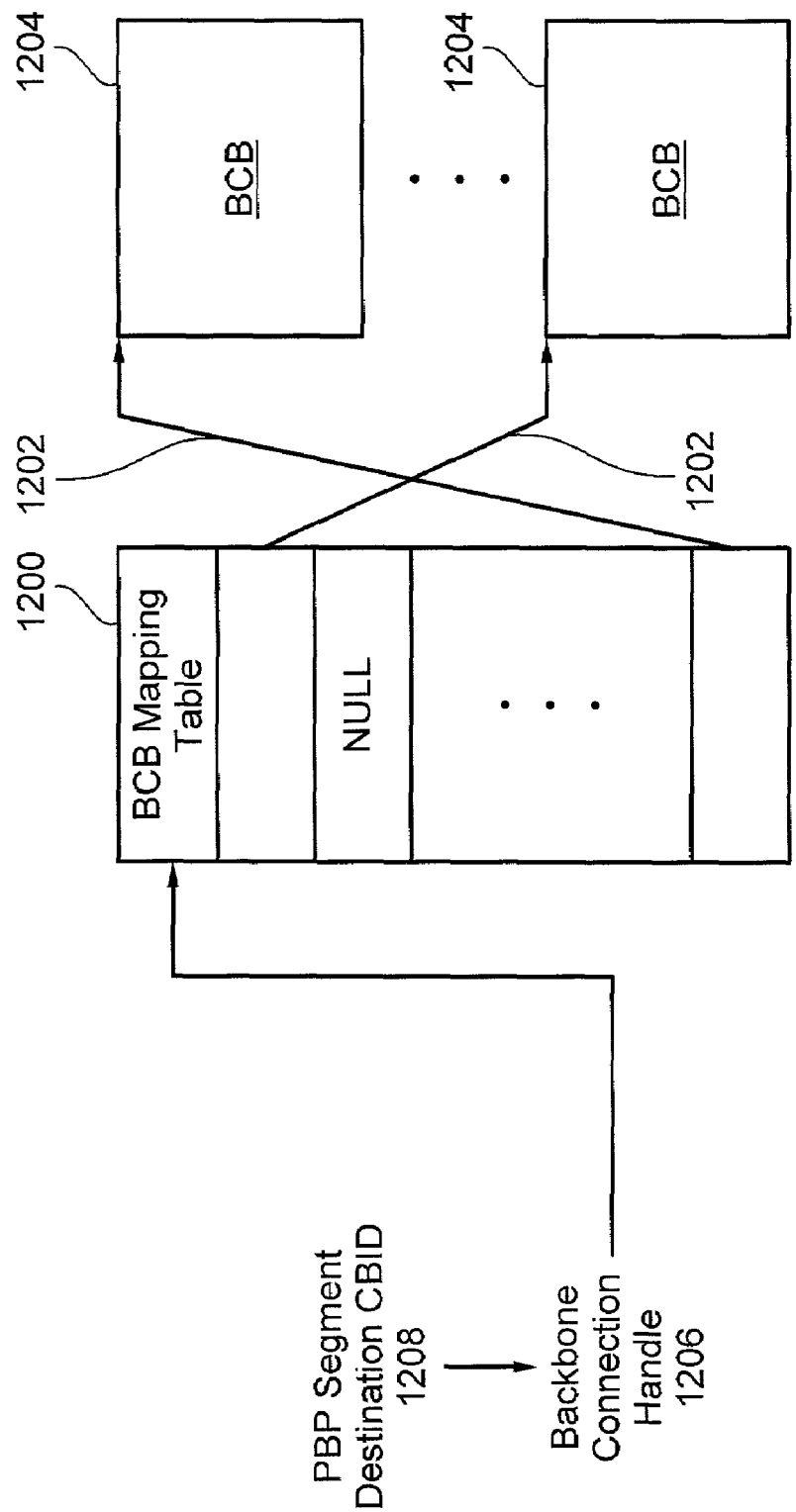
FIG. 12 is a diagram of a BCB mapping table.

The PBPK 282 uses a PBP backbone connection control block (BCB) to store information related to a particular PBP backbone connection. A BCB mapping table 1200 is used by BPK 282 to store pointers 1202 to BCBs 1204. FIG. 12 illustrates the use of the BCB mapping table 1200. BPK 282 uses the backbone connection handle assigned by the platform environment 210 as the index into the mapping table. In an exemplary embodiment, the handle 1206 is passed to BPK 282 by the platform environment 210 and by TSK 280 whenever they call a procedure which references the backbone connection (for example, when TSK 280 passes a TSK message to BPK 282 for transmission across the backbone connection). The handle is used as the destination control block identifier (CBID) 1208 in PBP segments received from a WAN with BPK 282 learning the identifier being used by its peer for the connection during connection establishment. (A value of 0xFFFF can be used as the destination CBID 1208 until the BPK 282 learns the peer's CBID for the connection. If a PEP End Point 705 receives a destination CBID 1208 of 0xFFFF in a PBP segment, it can construct the backbone connection handle 1206 from the peer index associated with the source of the PBP segment and the port number in the PBP header.) If the particular backbone protocol being used does not directly allow the use of a CBID as the "address" field in the protocol, BPK can either embed the CBID in the "address", if the "address" has more bits than a CBID, or use a simple mapping table to translate between CBIDs and whatever type of "address" is required, if the "address" has fewer bits than a CBID or the "address" format does not support embedding the CBID in the "address". ("address" refers to whatever field is used by the protocol to distinguish different connections. For example, if the protocol being used is TCP, the "address" field is the TCP port number.) Table 1 illustrates an exemplary BCB 1204.

TABLE 1

```
/* BP per connection stats should mirror total stats in bpk_stats_t */
typedef struct bpk_conn_stats_struct
{
    word seq_q_pkts;       /* pkts in sequential queue */
    word reseq_q_pkts;     /* pkts in ressequencing queue */
    /* counters which may can be cleared */
    struct
    {
        /* general counters */
        word tx_pkt;           /* BP pkts transmitted */
        word rx_pkt;           /* BP pkts received */
        word tx_poll;          /* POLLs transmitted */
        word rx_poll;          /* POLLs received */
        word tx_sack;          /* SACKs transmitted */
        word rx_sack;          /* SACKs received */
        word num_state_open;   /* times conn state changed to
                                  Open */
        /* error counters to debug a problem */
        word tx_syn;           /* SYNs transmitted */
        word rx_syn;           /* SYNs received */
        word tx_rst;           /* RSTs transmitted */
        word rx_rst;           /* RST received */
        word retx;             /* retransmissions */
        word bcb_mismatch;     /* pkts not matching indicated
                                  BCB */
        word rx_dup_syn;       /* duplicate SYNs received */
        word rx_outside_win;   /* pkts outside receive
                                  window */
        word flush_seq_q_pkts; /* sequential queue pkts
                                  flushed */
        word flush_reseq_q_pkts; /* resequencing queue pkts
                                    flushed */
        word syn_fail;         /* times 3-way handshake failed */
        word syn_restart;      /* SYN received when
                                  Open */
        word peer_no_reply;    /* no reply from peer */
        word internal_err;     /* unexpected internal error */
    } ctr;
} bpk_conn_stats_t;
/* All application users of BPK must provide a generic callback for data
*/
typedef void (* data_callback_t)(word cbid, pe_buffer_t *buf_ptr, word
pdu_len);
typedef struct bcb_struct
{
    word           scbid;         /* out CBID */
    word           dcbid;         /* peer's CBID */
    dword          src_ip;        /* our IP address */
    dword          dst_ip;        /* peer's IP address */
    byte           port;          /* BP port */
    pbps_t         state;
    byte           flags;
    byte           poll_retry;
    dword          poll_timer;
    dword          ack_timer;
    word           irs;           /* Initial Receive Sequence
                                     number */
    word           snd_next;
    word           snd_una;
    word           snd_max;       /* Tx window */
    word           rcv_max;       /* Rx window */
    word           rcv_next;      /* next in-sequenceing expecting */
    word           last_rcv_next;
    data_callback_t data_callback;
    bpk_buffer_t   *seq_head;
    bpk_buffer_t   *seq_tail;
    bpk_buffer_t   *past_win;
    bpk_buffer_t   *retx_head
    bpk_buffer_t   *retx_tail;
    bpk_buffer_t   *reseq_head;
```

TABLE 1-continued

```
    bpk_conn_stats_t stats;
} bcb_t;
```

An operator may configure backbone connections for each PEP End Point 705. A separate connection is configured for each desired priority. At startup, the platform environment 210 asks the BPK 282 to bring up each of the End Point's configured connections. A backbone connection can either be opened as passive (in which case BPK 282 waits for its peer to try to start the connection) or active (in which case BPK 282 tries to start the connection). Both PEP End Points 705 in a connection can open all backbone connections as active. This makes backbone connection establishment very aggressive, promoting quick recovery from various error scenarios (such as IP Gateway redundancy switches), albeit at the expense of the use of additional bandwidth when both PEP End Points are restarted at the same time.

While specific details may vary slightly from protocol to protocol, the following generally describes the operation of a backbone protocol being used by the invention.

Figure 15:
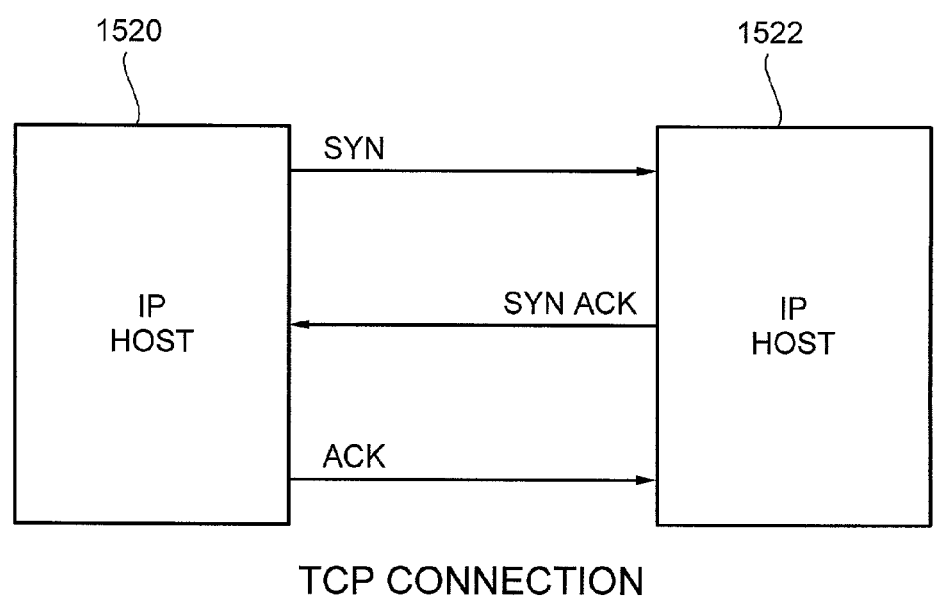
FIG. 15 is a diagram of a conventional TCP three-way handshake between the IP hosts.

When opened as active, BPK 282 brings up a backbone connection using a handshake which is very similar to the three-way handshake used by TCP (illustrated in FIG. 15). BPK 282 sends a BP <SYN> segment (or equivalent) to its BPK 282 peer. The peer BPK 282 responds to a received BP <SYN> segment with a BP <SYN,ACK> segment (or equivalent). When BPK 282 receives the <SYN,ACK> segment, it responds with a BP <ACK> segment (or equivalent) and the connection is ready to carry backbone traffic (e.g. TSK 280 messages). For each connection, BPK 282 calls the platform environment 210 to indicate that the connection is active (i.e., UP) when it receives a <SYN, ACK> segment in response to a transmitted <SYN> segment or an <ACK> segment in response to a transmitted <SYN,ACK> segment.

If the platform environment 210 has not opened a connection, the peer BPK 282 will not respond to the <SYN> segment. When this occurs, BPK will periodically send a new <SYN> segment to try to bring up the connection. BPK will continue to try to bring up the connection until either it comes up or the platform environment 210 closes the connection.

The BPK 282 can be responsible for maintaining all of the backbone connections. If a connection goes down, BPK 282 can report a status change to the platform environment 210 and attempt to bring the connection back up. (The platform environment 210, in turn, notifies the user(s) of the backbone connection, for example TSK 280.) When the connection comes back up, a status change is again reported to platform environment 210. During periods of no TSK message activity, BPK 282 can run an inactivity timer for each connection. Whenever the timer expires, BPK 282 can send a BP <NUL> segment (or equivalent) to its BPK peer to make sure the backbone connection is still active. To avoid unnecessarily wasting bandwidth, an inactivity timer used by one BPK 282 should be longer (by at least a round trip time) than the inactivity timer of the other BPK 282. This can prevent both BPK 282 peers from sending BP <NUL> packets to each other at the same time.

The PEP Backbone Protocol can include a checksum which can be used to detect corruption in a BP segment. Since errors are rare, the checksum can be disabled by default to conserve CPU. (Some backbone protocols may not support the ability to disable the checksum.) The checksum can be enabled by the operator if the operator believes that corruption errors are occurring. (BP checksums can be turned on for one or both directions of a connection.) Because calculating a BP checksum requires access to the entire BP segment, calculating the checksum is usually a platform specific function (since getting beyond the headers to the contents of a buffer is usually a platform specific function). When BPK 282 forwards an IP packet to the platform environment 210 for transmission, it can indicate whether or not it wants a checksum calculated for the packet. An exemplary value of 0 can be sent as the checksum when no checksum is required. This allows the platform environment 210 to determine at the time a BP segment is received whether or not a checksum verification is required. This is useful given that a PEP End Point, especially a hub site PEP End Point, might be receiving BP segments from some backbone connections with checksums disabled and some backbone connections with checksums enabled.

There are many reasons why a backbone connection might fail. In general, a failed backbone connection can be detected via retransmission timeouts. Reasons a backbone connection might fail include:

A link between two PEP End Points 705 may fail. For example, a spacelink may fail due to rain fade with no alternate links available or with alternate links available but with path selection rules blocking some or all of the backbone connections from using these links;

A component between two PEP End Points 705 may fail, breaking one or all of the links between the End Points 705. In the case where not all of the links fail, path selection rules may again block some backbone connections from being carried on alternate links;

A PEP End Point 705 may fail. If a PEP End Point 705 fails, all backbone connections to it usually fail. Note that if one PEP End Point 705 restarts, the other PEP End Point 705 may detect the failure by receiving a PBP <SYN> segment for a backbone connection rather than detect the failure via retransmission timeouts;

Protocol failures. BPK 282 may receive an invalid (in the current context) PBP segment which places the backbone connection into a state which can only be exited by restarting the connection. Protocol failures, in theory, should never occur as they probably represent implementation or design errors. But, in the real world, such errors might occur. BPK 282, in general, will respond to any invalid segment with a PBP <RST> segment in order to force the connection to restart.

The BPK 282 need not perform any special handling of connection priorities. The BPK 282 can treat the connection priority as a sort of "port" number which it uses to support multiple simultaneous connections to the same destination BPK peer. Priority handling of connections may occur outside of BPK 282 by means of the amount of buffer space BPK 282 has access to for a particular connection and by means of the rate at which BP segments are actually transmitted to the WAN by the PK 284.

A path MTU discovery algorithm is usable with TCP connections. The path MTU discovery algorithm is described in RFC 1191, the entire contents of which are hereby incorporated by reference in their entirety. Since the messages on which the algorithm is based are ICMP messages, BPK 282 can also implement path MTU discovery. The problem of needing to discover the path MTU can be avoided by using a worst case value for the configured path MTU. However, if the use of path discovery is desirable for efficiency, BPK 282 can use any received ICMP "Datagram Too Big" messages to adjust the maximum size of the data segments which it sends.

As indicated previously, BPK 282 can implement different backbone protocols for use with different types of backbone links. In some cases, the particular backbone protocol implemented is determined by the software build of the platform 210, based on the environment in which the platform is expected to be used. In other cases, multiple backbone protocols may be implemented by BPK 282 with the particular protocol used with a particular backbone link determined by the user when the PEP end point is configured. In the latter case, the particular protocols to be used for each backbone link may be specified in a PEP end point profile 701,703.

Figure 13:
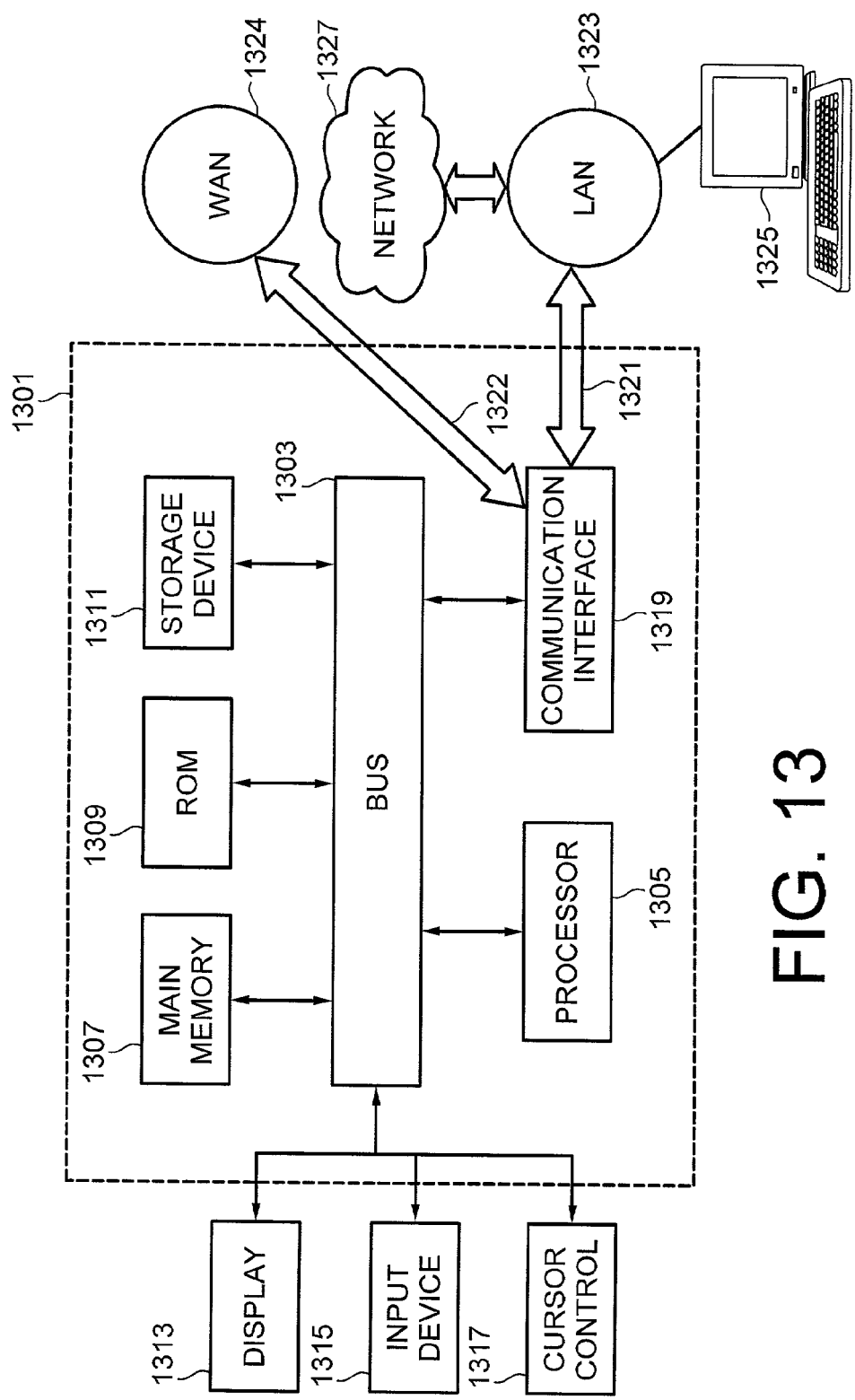
FIG. 13 is a diagram of a computer system that can perform PEP functions, in accordance with an embodiment of the present invention.
Figure 14:
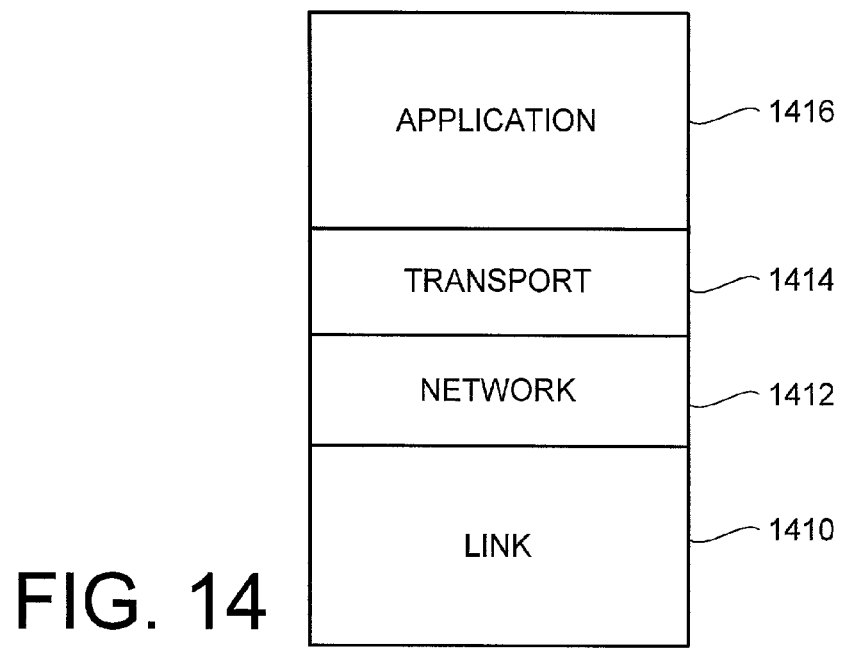
FIG. 14 is a diagram of the protocol layers of the TCP/IP protocol suite.

FIG. 13 illustrates a computer system 1301 upon which an embodiment according to the present invention may be implemented. Such a computer system 1301 may be configured as a server to execute code that performs the PEP functions of the PEP end point 210 as earlier discussed. Computer system 1301 includes a bus 1303 or other communication mechanism for communicating information, and a processor 1305 coupled with bus 1303 for processing the information. Computer system 1301 also includes a main memory 1307, such as a random access memory (RAM) or other dynamic storage device, coupled to bus 1303 for storing information and instructions to be executed by processor 1305. In addition, main memory 1307 may be used for storing temporary variables or other intermediate information during execution of instructions to be executed by processor 1305. Main memory 1307 may also be used to store PEP control blocks, in particular with respect to the present invention, BCBs, and buffers used to store packets. Computer system 1301 further includes a read only memory (ROM) 1309 or other static storage device coupled to bus 1303 for storing static information and instructions for processor 1305. A storage device 1311, such as a magnetic disk or optical disk, is provided and coupled to bus 1303 for storing information and instructions.

Computer system 1301 may be coupled via bus 1303 to a display 1313, such as a cathode ray tube (CRT), for displaying information to a computer user. An input device 1315, including alphanumeric and other keys, is coupled to bus 1303 for communicating information and command selections to processor 1305. Another type of user input device is cursor control 1317, such as a mouse, a trackball, or cursor direction keys for communicating direction information and command selections to processor 1305 and for controlling cursor movement on display 1313.

Embodiments are related to the use of computer system 1301 to perform the PEP functions of the PEP end point 210. According to one embodiment, this automatic update approach is provided by computer system 1301 in response to processor 1305 executing one or more sequences of one or more instructions contained in main memory 1307. Such instructions may be read into main memory 1307 from another computer-readable medium, such as storage device 1311. Execution of the sequences of instructions contained in main memory 1307 causes processor 1305 to perform the process steps described herein. One or more processors in a multi-processing arrangement may also be employed to execute the sequences of instructions contained in main memory 1307. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 1305 for execution the PEP functions of the PEP end point 210. Such a medium may take many forms, including but not limited to, non-volatile media, volatile media, and transmission media. Non-volatile media includes, for example, optical or magnetic disks, such as storage device 1311. Volatile media includes dynamic memory, such as main memory 1307. Transmission media includes coaxial cables, copper wire and fiber optics, including the wires that comprise bus 1303. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1305 for execution. For example, the instructions may initially be carried on a magnetic disk of a remote computer. The remote computer can load the instructions relating to execution of the PEP functions of the PEP end point 210 into its dynamic memory and send the instructions over a telephone line using a modem. A modem local to computer system 1301 can receive the data on the telephone line and use an infrared transmitter to convert the data to an infrared signal. An infrared detector coupled to bus 1303 can receive the data carried in the infrared signal and place the data on bus 1303. Bus 1303 carries the data to main memory 1307, from which processor 1305 retrieves and executes the instructions. The instructions received by main memory 1307 may optionally be stored on storage device 1311 either before or after execution by processor 1305.

Computer system 1301 also includes one or more communication interfaces 1319 coupled to bus 1303. Communication interfaces 1319 provide a two-way data communication coupling to network links 1321 and 1322 which are connected to a local area network (LAN) 1323 and a wide area network (WAN) 1324, respectively. The WAN 1324, according to one embodiment of the present invention, may be a satellite network. For example, communication interface 1319 may be a network interface card to attach to any packet switched LAN. As another example, communication interface 1319 may be an asymmetrical digital subscriber line (ADSL) card, an integrated services digital network (ISDN) card, a cable modem, or a modem to provide a data communication connection to a corresponding type of telephone line. Wireless links may also be implemented. In any such implementation, communication interface 1319 sends and receives electrical, electromagnetic or optical signals that carry digital data streams representing various types of information.

Network link 1321 typically provides data communication through one or more networks to other data devices. For example, network link 1321 may provide a connection through local area network 1323 to a host computer 1325 or to data equipment operated by an Internet Service Provider (ISP) 1327. ISP 1327 in turn provides data communication services through the Internet 505. In addition, LAN 1323 is linked to an intranet 1329. The intranet 1329, LAN 1323 and Internet 505 all use electrical, electromagnetic or optical signals that carry digital data streams. The signals through the various networks and the signals on network link 1321 and through communication interface 1319, which carry the digital data to and from computer system 1301, are exemplary forms of carrier waves transporting the information.

Computer system 1301 can send messages and receive data, including program code, through the network(s), network link 1321 and communication interface 1319. In the Internet example, a server 1331 might transmit a requested code for an application program through Internet 505, ISP 1327, LAN 1323 and communication interface 1319.

The received code may be executed by processor 1305 as it is received, and/or stored in storage device 1311, or other non-volatile storage for later execution. In this manner, computer system 1301 may obtain application code in the form of a carrier wave.

Computer system 1701 can transmit notifications and receive data, including program code, through the network(s), network link 1721 and communication interface 1719.

The techniques described herein provide several advantages over prior approaches to improving network performance, particularly in a packet switched network such as the Internet. A local PEP end point and a remote PEP end point communicate to optimize the exchange of data through a TCP spoofing functionality. A backbone protocol kernel provides significant flexibility and backbone link tailored performance in support of PEP functionality by implementing a backbone protocol appropriate for a particular backbone link and by supporting different backbone protocols for different backbone links.

Obviously, numerous modifications and variations of the present invention are possible in light of the above teachings. It is therefore to be understood that within the scope of the appended claims, the invention may be practiced otherwise than as specifically described herein.

What is claimed is:

1. A method for routing information in a communication system, the method comprising:
receiving the information from a platform configured to support performance enhancing functions including protocol spoofing, and receiving backbone connection parameters, wherein a backbone connection apparatus maintains a profile that includes the backbone connection parameters associated with a backbone connection to a peer platform, wherein the backbone connection parameters include information relating to traffic compression over the backbone connection and information relating to the protocol spoofing; and
routing the information over the backbone connection in accordance with the profile.

2. The method of claim 1, further comprising:
determining one of a plurality of backbone connections including the backbone connection for reaching the peer platform.

3. The method of claim 2, further comprising:
determining the backbone connection by applying a mapping table.

4. The method of claim 3, wherein the mapping table maps segment destination identifiers to backbone control blocks.

5. The method of claim 4, wherein the backbone control blocks store information related to the backbone connection.

6. The method of claim 4, wherein the mapping table stores pointers to the backbone control blocks.

7. The method of claim 1, further comprising:
receiving the backbone connection parameters as a data structure from the platform.

8. The method of claim 1, further comprising:
receiving the backbone connection parameters from the platform at start-up or when the platform receives updated backbone connection parameters.

9. The method of claim 8, wherein the profile includes at least one backbone connection protocol for at least one type of connection link.

10. The method of claim 9, wherein first type of link runs a first type of backbone connection protocol and a second type of link runs a second type of backbone connection protocol.

11. The method of claim 10, wherein the first type of link and the second type of link are run simultaneously.

12. A communication system comprising:
a platform configured to provide performance enhancing functions including protocol spoofing, the platform supplying information and backbone connection parameters;
a backbone connection apparatus communicating with the platform, the backbone connection apparatus being configured to receive the information and the backbone connection parameters from the platform, wherein the backbone connection apparatus has a profile that includes the backbone connection parameters associated with a backbone connection to a peer platform, wherein the backbone connection parameters include information relating to traffic compression over the backbone connection and information relating to the protocol spoofing, wherein the communication system is configured to route the information in accordance with the profile.

13. The communication system of claim 12, wherein the backbone connection apparatus determines one of a plurality of backbone connections including the backbone connection for reaching the peer platform.

14. The communication system of claim 12, wherein the backbone connection apparatus determines the backbone connection by applying a mapping table.

15. The communication system of claim 12, wherein the mapping table maps segment destination identifiers to backbone control blocks.

16. The communication system of claim 15, wherein the backbone control blocks store information related to the backbone connection.

17. The communication system of claim 15, wherein the mapping table stores pointers to the backbone control blocks.

18. The communication system of claim 12, wherein the backbone connection apparatus receives the backbone connection and parameters as a data structure from the platform.

19. The communication system of claim 12, wherein the backbone connection apparatus receives the backbone connection parameters from the platform at start-up or when the platform receives updated backbone connection parameters.

20. The communication system of claim 19, wherein the profile includes at least one backbone connection protocol for at least one type of connection link.

21. The communication system of claim 20, wherein a first type of link runs a first type of backbone connection protocol and a second type of link runs a second type of backbone connection protocol.

22. The communication system of claim 20, wherein the first type of link and the second type of link are run simultaneously.

23. A backbone connection apparatus for routing information in a communication system, the apparatus comprising:
means for receiving the information and at least one of path selection and path activation parameters;
means for maintaining a profile containing the backbone connection parameters associated with a backbone connection to a peer platform, wherein the backbone connection parameters include information relating to traffic compression over the backbone connection and information relating to protocol spoofing; and
means for routing the information in accordance with the profile.

24. The backbone connection apparatus of claim 23, wherein the backbone connection apparatus determines one of a plurality of backbone connections including the backbone connection for reaching the peer platform.

25. The backbone connection apparatus of claim 23, wherein the backbone connection apparatus determines the backbone connection by applying a mapping table.

26. The backbone connection apparatus of claim 25, wherein the mapping table maps segment destination identifiers to backbone control blocks.

27. The backbone connection apparatus of claim 26, wherein the backbone control blocks store information related to the backbone connection.

28. The backbone connection apparatus of claim 26, wherein the mapping table stores pointers to the backbone control blocks.

29. The backbone connection apparatus of claim 23, wherein the backbone connection apparatus receives the backbone connection parameters as a data structure from the platform.

30. The backbone connection apparatus of claim 23, wherein the backbone connection apparatus receives the backbone connection parameters from the platform at start-up or when the platform receives updated backbone connection parameters.

31. The backbone connection apparatus of claim 30, wherein the profile includes at least one backbone connection protocol for at least one type of connection link.

32. The backbone connection apparatus of claim 31, wherein a first type of link runs a first type of backbone connection protocol and a second type of link runs a second type of backbone connection protocol.

33. The backbone connection apparatus of claim 32, wherein the first type of link and the second type of link are run simultaneously.

34. A computer-readable medium carrying one or more sequences of one or more instructions for routing information in a communication system, the one or more sequences of one or more instructions including instructions which, when executed by one or more processors, cause the one or more processors to perform the steps of:
receiving the information from a platform configured to support performance enhancing functions including protocol spoofing, and receiving backbone connection parameters, wherein a backbone connection apparatus maintains a profile that includes the backbone connection parameters associated with a backbone connection to a peer platform, wherein the backbone connection parameters include information relating to traffic compression over the backbone connection and information relating to the protocol spoofing; and
routing the information over the backbone connection in accordance with the profile.

35. The computer-readable medium of claim 34, further comprising:
    determining one of a plurality of backbone connections including the backbone connection for reaching the peer platform.

36. The computer-readable medium of claim 34, further comprising:
    determining the backbone connection by applying a mapping table.

37. The computer-readable medium of claim 36, wherein the mapping table maps segment destination identifiers to backbone control blocks.

38. The computer-readable medium of claim 37, wherein the backbone control blocks store information related to the backbone connection.

39. The computer-readable medium of claim 37, wherein the mapping table stores pointers to the backbone control blocks.

40. The computer-readable medium of claim 34, further comprising:
    receiving the backbone connection parameters as a data structure from the platform.

41. The computer-readable medium of claim 34, further comprising:
    receiving the backbone connection parameters from the platform at start-up or when the platform receives updated backbone connection parameters.

42. The computer-readable medium of claim 41, wherein the profile includes at least one backbone connection protocol for at least one type of connection link.

43. The computer-readable medium of claim 42, wherein a first type of link runs a first type of backbone connection protocol and a second type of link runs a second type of backbone connection protocol.

44. The computer-readable medium of claim 43, wherein the first type of link and the second type of link are run simultaneously.

* * * * *